(12) United States Patent
Ghosh et al.

(10) Patent No.: US 11,282,152 B2
(45) Date of Patent: Mar. 22, 2022

(54) REAL PROPERTY VALUATION SYSTEM USING TRAFFIC FLOW INFORMATION

(71) Applicant: ADP, Inc., Roseland, NJ (US)

(72) Inventors: Debashis Ghosh, Charlotte, NC (US); John Anthony Derrico, Harrington Park, NJ (US)

(73) Assignee: ADP, Inc., Roseland, NJ (US)

( * ) Notice: Subject to any disclaimer, the term of this patent is extended or adjusted under 35 U.S.C. 154(b) by 909 days.

(21) Appl. No.: 15/243,038

(22) Filed: Aug. 22, 2016

(65) Prior Publication Data
US 2018/0053270 A1 Feb. 22, 2018

(51) Int. Cl.
*G06Q 50/16* (2012.01)
*G06F 16/29* (2019.01)
*G06F 3/0484* (2013.01)

(52) U.S. Cl.
CPC ......... *G06Q 50/163* (2013.01); *G06F 3/0484* (2013.01); *G06F 16/29* (2019.01)

(58) Field of Classification Search
CPC ..... G06F 16/29; G06F 3/0484; G06Q 50/163; G06Q 50/16
See application file for complete search history.

(56) References Cited

U.S. PATENT DOCUMENTS

| | | | |
|---|---|---|---|
| 6,317,686 B1 * | 11/2001 | Ran | G01C 21/3691 701/117 |
| 6,871,140 B1 | 3/2005 | Florance et al. | |
| 8,055,578 B1 | 11/2011 | Hallman | |
| 8,527,376 B1 | 9/2013 | Bueche, Jr. | |
| 8,732,219 B1 * | 5/2014 | Ferries | G06F 16/444 707/825 |
| 8,788,431 B1 | 7/2014 | Shao et al. | |
| 10,067,950 B1 * | 9/2018 | Zyskowski | G06T 11/60 |
| 2001/0051947 A1 | 12/2001 | Morimoto et al. | |
| 2002/0087389 A1 | 7/2002 | Sklarz et al. | |
| 2005/0160033 A1 | 7/2005 | VanKirk et al. | |
| 2006/0136090 A1 | 6/2006 | Koromyslov et al. | |
| 2007/0293958 A1 * | 12/2007 | Stehle | G06Q 30/0207 700/30 |
| 2008/0140628 A1 | 6/2008 | Ubalde et al. | |
| 2008/0270292 A1 | 10/2008 | Ghosh et al. | |
| 2008/0288415 A1 | 11/2008 | Ghosh et al. | |

(Continued)

FOREIGN PATENT DOCUMENTS

WO 2011109576 A1 9/2011

OTHER PUBLICATIONS www.census.gov, as displayed on Feb. 21, 2015 using the way back machine (Year: 2015).*

(Continued)

*Primary Examiner* — Carrie S Gilkey
(74) *Attorney, Agent, or Firm* — Yee & Associates, P.C.

(57) ABSTRACT

A method and apparatus for analyzing real property. A request for traffic flow information for a workforce for a region in a selected level in a hierarchy of levels in a real property database is received by a computer system. The traffic flow information for the workforce is displayed by the computer system in a graphical user interface on the display system. The traffic flow information for the workforce displayed in the graphical user interface on the display system enables performing an operation with respect to real property.

21 Claims, 16 Drawing Sheets

(56) References Cited

U.S. PATENT DOCUMENTS

| | | | |
|---|---|---|---|
| 2008/0303694 A1* | 12/2008 | Ury | G08G 1/127 |
| | | | 340/907 |
| 2009/0055308 A1 | 2/2009 | Ghosh et al. | |
| 2009/0089149 A1 | 4/2009 | Lerner et al. | |
| 2009/0313030 A1 | 12/2009 | Karmel et al. | |
| 2010/0076813 A1 | 3/2010 | Ghosh et al. | |
| 2010/0094750 A1 | 4/2010 | Ghosh et al. | |
| 2010/0106639 A1 | 4/2010 | Banerjee et al. | |
| 2010/0156933 A1* | 6/2010 | Jones | G06Q 40/123 |
| | | | 345/629 |
| 2011/0137735 A1 | 6/2011 | Jetha et al. | |
| 2011/0178920 A1 | 7/2011 | Ghosh et al. | |
| 2011/0202436 A1 | 8/2011 | Gummuluri et al. | |
| 2011/0218934 A1 | 9/2011 | Elser | |
| 2012/0029956 A1 | 2/2012 | Ghosh et al. | |
| 2012/0035983 A1* | 2/2012 | Taylor | G06Q 10/105 |
| | | | 705/7.33 |
| 2012/0197782 A1 | 8/2012 | Ghosh et al. | |
| 2013/0041841 A1 | 2/2013 | Lyons | |
| 2013/0151439 A1 | 6/2013 | Galaska | |
| 2013/0179357 A1* | 7/2013 | Den Herder | G06Q 30/0206 |
| | | | 705/306 |
| 2014/0257924 A1 | 9/2014 | Xie et al. | |
| 2014/0278802 A1 | 9/2014 | MacPherson | |
| 2014/0358414 A1* | 12/2014 | Ibrahim | G08G 1/0129 |
| | | | 701/118 |
| 2015/0012303 A1 | 1/2015 | Ghosh | |
| 2015/0112879 A1 | 4/2015 | Ghosh et al. | |
| 2015/0120584 A1 | 4/2015 | Ghosh et al. | |
| 2015/0177011 A1* | 6/2015 | Ibrahimi | G01C 21/3492 |
| | | | 701/465 |
| 2016/0055594 A1* | 2/2016 | Emison | G06Q 40/08 |
| | | | 705/4 |
| 2016/0140652 A1 | 5/2016 | Ghosh et al. | |
| 2016/0148406 A1 | 5/2016 | Ghosh et al. | |

OTHER PUBLICATIONS

"Journey to Work, Long Island & New York City: Still Connected," Jun. 2015 (Year: 2015).*

A. Abadi, T. Rajabioun and P. A. Ioannou, "Traffic Flow Prediction for Road Transportation Networks With Limited Traffic Data," in IEEE Transactions on Intelligent Transportation Systems, vol. 16, No. 2, pp. 653-662, Apr. 2015, doi: 10.1109/TITS.2014.2337238. (Year: 2015).*

Ghosh et al., "Real Property Valuation System," U.S. Appl. No. 15/242,947, filed Aug. 22, 2016, 52 pages.

Office Action dated Nov. 27, 2018 regarding U.S. Appl. No. 15/242,947, 27 pages.

Office Action dated Sep. 18, 2019, regarding U.S. Appl. No. 15/242,947, 52 pages.

Justicemap: Visualize race and income data in your community, Aug. 26, 2014, https://web.archive.org:80/index. php?giAdvanced=1, 5 pages.

Final Office Action, dated Apr. 18, 2019, regarding U.S. Appl. No. 15/242,947, 58 pages.

* cited by examiner

EARNINGS STATEMENT

PERIOD BEGINNING: 9/8/2008
PERIOD END: 9/21/2008
PAY DATE: 9/19/2008

602 — JANE E DOE
604 — 000 ANYTOWN ST.
MY PLACE, USA 110000

123 MAIN ST.
ANYTOWN, USA 12345

| CO | FILE | DEPT | CHECK NO. |
|---|---|---|---|
| 2LJ | | 000100 | 82910 |

606

TAXABLE MARITAL STATUS: MARRIED
EXEMPTIONS/ALLOWANCES:
FEDERAL: 1    STATE: QH:1

608 / 610

| EARNINGS | RATE | HOURS | THIS PERIOD | YEAR TO DATE |
|---|---|---|---|---|
| REGULAR | 14.42 | 8.00 | 115.36 | |
| OVERTIME | 21.630 | .15 | 3.24 | |
| VACATION | | 72.00 | 1,038.24 | |
| GROSS PAY | | | $1,156.84 | 22,135.10 |

| DEDUCTIONS | STATUTORY | | |
|---|---|---|---|
| 616 — | FEDERAL INCOME TAX | -71.65 | 2,940.37 |
| 618 — | SOCIAL SECURITY TAX | -71.56 | 1,370.34 |
| 620 — | MEDICARE TAX | -16.73 | 320.48 |
| 622 — | OH STATE INCOME TAX | -28.61 | 632.46 |
| 624 — | COLUMBUS TAX | -23.08 | 442.05 |
| | OTHER | | |
| 628 — | LTD | -4.85 | 57.18 |
| 630 — | PERSONAL PLANS | -6.90 | 45.06 |
| 632 — | PERSONAL ACCIDENT | -2.77* | 32.83 |
| 634 — | 401K | -34.71* | 400.68 |
| 614 — | NET PAY | $895.98 | |

615, 626, 612

*EXCLUDED FROM FEDERAL TAXABLE WAGES

| OTHER BENEFITS AND INFORMATION | THIS PERIOD | YEAR TO DATE |
|---|---|---|
| 638 — 401K PRE & POST | 34.71 | |
| ASSOCIATE ID | | 223072 |
| REGULAR HOURS-ANNUAL | | 815.31 |
| OT HRS - ANNUAL | | 4.10 |
| ALL HOURS - ANNUAL | | 974.99 |
| OT EARNS - ANNUAL | | 88.68 |
| COMMISSIONS - ANNUAL — 642 | | 8,046.19 |
| VACATION EARNS — 644 | | 859.14 |
| | | 11,756.77 |
| BEREAVEMENT — 646 | | 115.36 |
| HOLIDAY — 648 | | 230.72 |
| PAY NOTICE | | 1,038.24 |
| QTD REGULAR 401(K) | | 365.95 |
| YTD REGULAR 401(K) | | 400.68 |

636, 640, 650

YOUR FEDERAL TAXABLE WAGES THIS PERIOD ARE $1,119.36

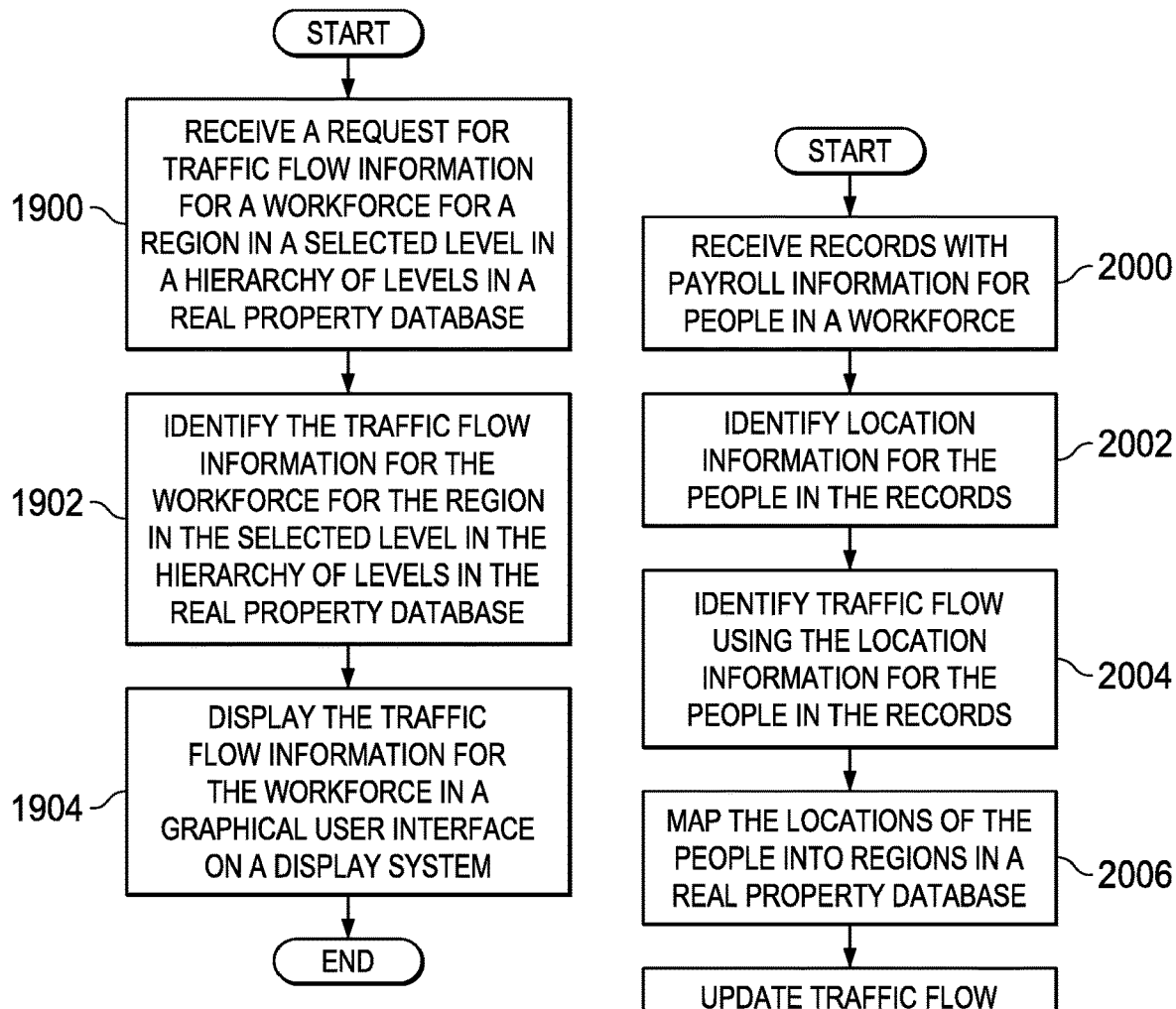
FIG. 19
FIG. 20
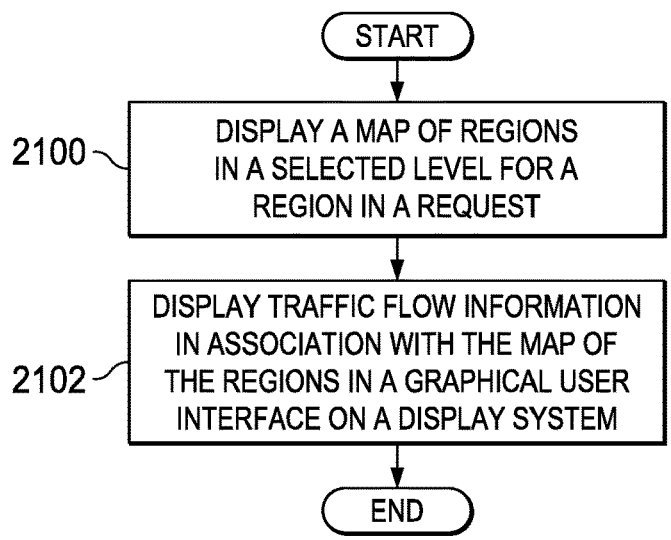
FIG. 21

REAL PROPERTY VALUATION SYSTEM USING TRAFFIC FLOW INFORMATION

This application is related to the following patent applications: entitled "Real Property Valuation System", Ser. No. 15/242,947; filed even date hereof and assigned to the same assignee. The aforementioned application is incorporated herein by reference in its entirety.

BACKGROUND INFORMATION

1. Field

The present disclosure relates generally to an improved computer system and, in particular, to a method and apparatus evaluating real properties. Still more particularly, the present disclosure relates to a method and apparatus for identifying accurate values for the real properties.

2. Background

Identifying value of real properties is performed for various real property operations. The operations include, for example, project planning, pricing new sales, property development, and other operations. One manner in which the value of the real properties is identified includes analyzing comparables. The comparables are properties with characteristics similar to the property in question that may be compared to identify the value of the real property. For example, factors that are examined for the comparables include conditions of sale, financing conditions, market conditions, vocational comparability, and physical comparability.

However, identifying and evaluating the real properties that are considered to be comparables is subjective. As a result, identifying prices of the real properties may not be as accurate as desired. Further, appraisal data often becomes outdated based on market changes.

Further, the identification of the comparables only provides a snapshot of the value of the real properties in time. This type of analysis is static and does not lend itself to identifying trends for the real properties.

Therefore, it would be desirable to have a method and apparatus that take into account at least some of the issues discussed above, as well as other possible issues. For example, it would be desirable to have a method and apparatus that overcome a technical problem with identifying the value of the real properties with a desired level of accuracy.

SUMMARY

An embodiment of the present disclosure provides a computer system. The computer system comprises a display system, a real property database, and a property analyzer. The real property database comprising traffic flow information for a workforce in regions based on locations of people. The regions are organized into levels in a hierarchy in which a parent region in a first level in the levels is comprised of child regions in a second level in the levels that is below the first level in the hierarchy. The property analyzer is in communication with the display system and the real property database. The property analyzer receives a request for the traffic flow information for the workforce in a region in a selected level in the hierarchy. Next, the property analyzer identifies the traffic flow information for the workforce for the region in the selected level in the hierarchy in the real property database. The property analyzer then displays the traffic flow information for the workforce in a graphical user interface on the display system. The traffic flow information for the workforce displayed in the graphical user interface on the display system enables performing an operation with respect to real property.

Another embodiment of the present disclosure provides a method for analyzing real property. A request for traffic flow information for a workforce for a region in a selected level in a hierarchy of levels in a real property database is received by a computer system. The traffic flow information for the workforce is displayed by the computer system in a graphical user interface on the display system. The traffic flow information for the workforce displayed in the graphical user interface on the display system enables performing an operation with respect to real property.

Yet another embodiment of the present disclosure provides a computer program product for analyzing real property. The computer program product comprises a computer readable storage media, first program code, second program code, and third program code. The first program code, the second program code, and the third program code are stored on the computer readable storage media. The first program code receives a request for traffic flow information for a workforce for a region in a selected level in a hierarchy of levels in a real property database. The second program code identifies the traffic flow information for the workforce for the region in the selected level in the hierarchy of levels in the real property database. The third program code displays the traffic flow information for the workforce in a graphical user interface on a display system. The traffic flow information for the workforce displayed in the graphical user interface on the display system enables performing an operation with respect to real property.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a record in accordance with an illustrative embodiment;

FIG. 19 is an illustration of a flowchart of a process for analyzing real property in accordance with an illustrative embodiment;

FIG. 20 is an illustration of a flowchart of a process for updating a real property database in accordance with an illustrative embodiment;

FIG. 21 is an illustration of a flowchart of a process for displaying traffic flow information in a graphical user interface in accordance with an illustrative embodiment.

DETAILED DESCRIPTION

Figure 1:
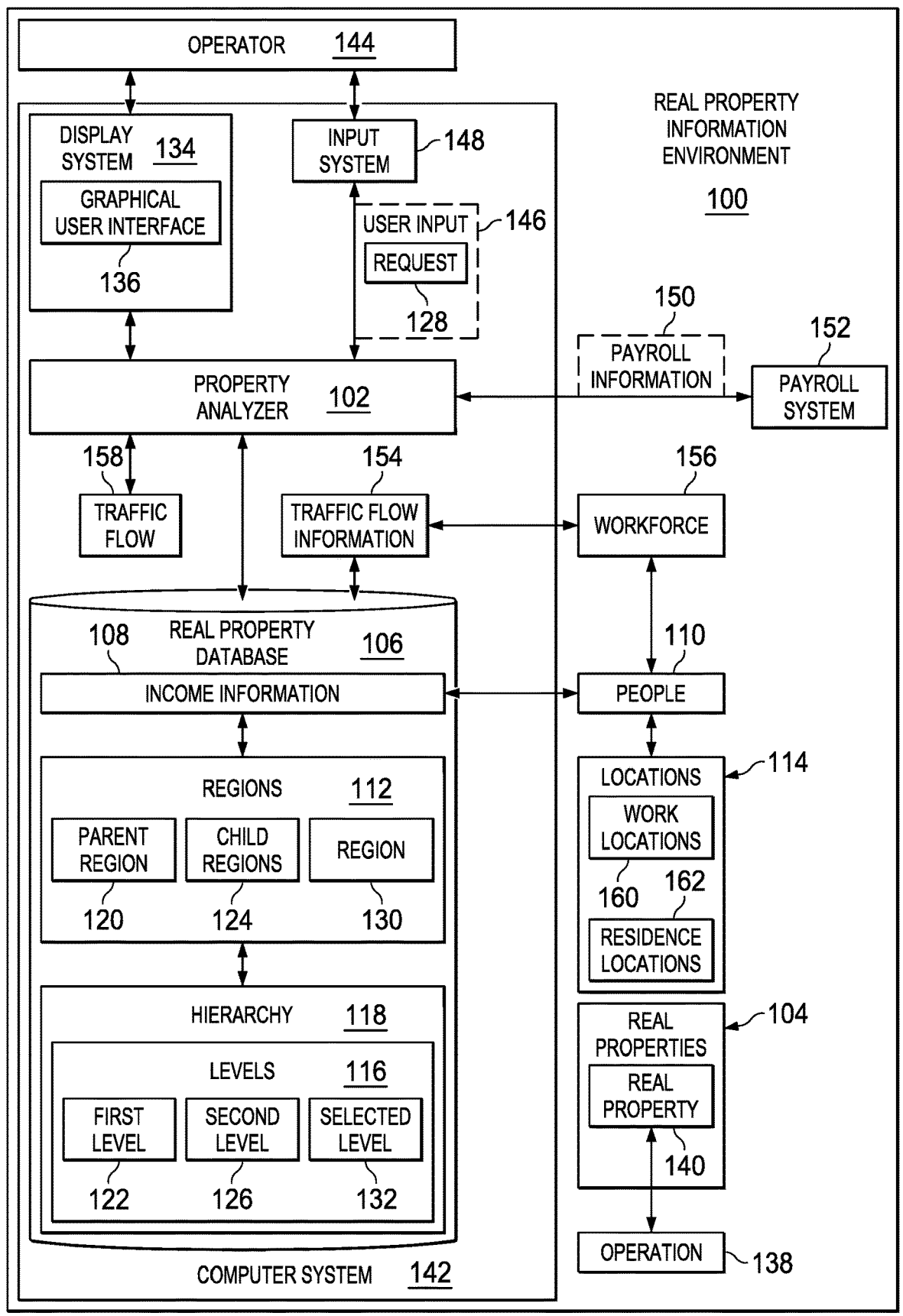
FIG. 1 is an illustration of a block diagram of a real property information environment in accordance with an illustrative embodiment.

The illustrative embodiments recognize and take into account one or more different considerations. For example, the illustrative embodiments recognize and take into account that current methodologies for identifying value of real properties are not as accurate as desired. The illustrative embodiments also recognize and take into account that actual rent data and census information are used in identifying the value of the real properties. Those embodiments recognize and take into account that this type of information is often inaccurate as entered, is outdated, or both.

Additionally, the illustrative embodiments also recognize and take into account that additional factors should be considered in identifying the value of the real properties. For example, the illustrative embodiments recognize and take into account that identifying a trend in the value of the real properties may be helpful in making an evaluation of the value of a real property. In another example, the illustrative embodiments recognize and take into account that at least one of willingness to pay, ability to pay, or stability of income should be taken into account in evaluating the value of the real properties.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The illustrative embodiments recognize and take into account that other sources of data may be more accurate than those currently used. For example, the illustrative embodiments recognize and take into account that information from payroll databases is more accurate than rent data and census data when analyzing attributes such as willingness to pay, ability to pay, and stability of income.

The illustrative embodiments also recognize and take into account that another source of information that is useful in evaluating real properties is a traffic flow of people. The illustrative embodiments recognize and take into account that the traffic flow for a workforce in a region may be useful in evaluating the region. Based on the traffic flow of the workforce, an evaluation may be used to evaluate not only the region for which the traffic flow of people in the workforce flow into a selected region of interest occurs, but other regions through which the traffic flow may occur to reach the selected region.

Thus, the illustrative embodiments provide a method and apparatus for analyzing real properties. In one illustrative example, a computer system receives a request for income information for a region in a selected level in a hierarchy of levels in a real property database. The computer system identifies the income information for the region in the selected level in the hierarchy in the real property database and displays the income information in a graphical user interface on a display system. The income information displayed in the graphical user interface on the display system enables performing an operation with respect to the real property.

Further, the illustrative embodiments provide a method and apparatus for analyzing real properties using workflow information. In one illustrative example, a request for traffic flow information for a workforce for a region in a selected level in a hierarchy of levels in a real property database is received. The traffic flow information for the workforce for the region in the selected level in the hierarchy of levels is identified in the real property database. The traffic flow information for the workforce is displayed in a graphical user interface on a display system, wherein the traffic flow information for the workforce displayed in the graphical user interface on the display system enables performing an operation with respect to real property.

With reference now to the figures and, in particular, with reference to FIG. 1, an illustration of a block diagram of a real property information environment is depicted in accordance with an illustrative embodiment. Real property information environment 100 includes property analyzer 102. Property analyzer 102 may be used to analyze real properties 104. Real properties 104 may include at least one of land, land with improvements, land with crops, or land with natural resources.

As depicted, property analyzer 102 is in communication with real property database 106. Property analyzer 102 analyzes real properties 104 using real property database 106.

In this illustrative example, real property database 106 comprises income information 108 for people 110 in regions 112 based on locations 114 of people 110 in real properties 104. As depicted, regions 112 are organized into levels 116 in hierarchy 118 in which parent region 120 in first level 122 in levels 116 is comprised of child regions 124 in second level 126 that is below first level 122 in hierarchy 118.

Additionally, real property database 106 also comprises traffic flow information 154 for workforce 156 in regions 112 based on locations 114 for people 110 in workforce 156. Traffic flow information 154 is used to identify traffic flow 158 into regions 112. For example, traffic flow 158 into region 130 may be identified from other ones of regions 112. Further, traffic flow 158 also may be within region 130 based on locations 114 of people 110 in workforce 156 for region 130.

In this illustrative example, income information 108 may be derived from payroll information 150 received from payroll system 152. Further, locations 114 also may be derived from payroll information 150. Deriving income information 108 and locations 114 may include at least one of locating the information in payroll information 150 or calculating the information from payroll information 150.

As depicted, traffic flow information 154 also may be derived from payroll information 150 received from payroll system 152. Traffic flow information 154 may be identified using locations 114 for people 110 in workforce 156. As depicted, locations 114 include at least one of work locations 160 and residence locations 162 for people 110 in workforce 156.

Payroll system 152 may be, for example, in an organization or a payroll company that performs payroll for many organizations in many different geographic locations. For example, payroll system 152 may be a regional payroll system, a nationwide payroll system, or an international payroll system.

Property analyzer 102 receives request 128 for income information 108 for region 130 in selected level 132 in hierarchy 118. Property analyzer 102 identifies income information 108 for region 130 in selected level 132 in hierarchy 118 in real property database 106.

As another illustrative example, request 128 may be for traffic flow information 154 for workforce 156 in region 130 in selected level 132 in hierarchy 118 of levels 116. As depicted, property analyzer 102 identifies traffic flow information 154 for region 130 in selected level 132 in hierarchy 118 using real property database 106.

Depending on selected level 132 in hierarchy 118, region 130 may be selected from one of a census block, a block group, a census track, a county, a state, and a region of the county in this particular example. Other types of hierarchies or types of partitions may be used in other examples.

Property analyzer 102 is also in communication with display system 134 and displays income information 108 in graphical user interface 136 on display system 134. At least one of income information 108 for traffic flow information 154 is displayed in graphical user interface 136 on display system 134 that enables performing operation 138 with respect to real property 140 in real properties 104.

Property analyzer 102 may be implemented in software, hardware, firmware, or a combination thereof. When software is used, the operations performed by property analyzer 102 may be implemented in program code configured to run on hardware, such as a processor unit. When firmware is used, the operations performed by property analyzer 102 may be implemented in program code and data and stored in persistent memory to run on a processor unit. When hardware is employed, the hardware may include circuits that operate to perform the operations in property analyzer 102.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Computer system 142 is a physical hardware system and includes one or more data processing systems. When more than one data processing system is present, those data processing systems are in communication with each other using a communications medium. The communications medium may be a network, such as a local area network (LAN), a wide area network (WAN), an intranet, or the Internet. The data processing systems may be selected from at least one of a computer, a server computer, a tablet, or some other suitable data processing system.

In this depicted example, display system 134 is connected to computer system 142. Display system 134 is a physical hardware system and includes one or more display devices on which graphical user interface 136 may be displayed. The display devices may include at least one of a light emitting diode (LED) display, a liquid crystal display (LCD), an organic light emitting diode (OLED) display, or some other suitable device on which graphical user interface 136 can be displayed.

Operator 144 is a person that may interact with graphical user interface 136 through user input 146 generated by operating input system 148 for computer system 142. Input system 148 is a physical hardware system and may be selected from at least one of a mouse, a keyboard, a trackball, a touchscreen, a stylus, a motion sensing input device, a cyber glove, or some other suitable type of input device.

In one illustrative example, one or more technical solutions are present that overcome a technical problem with identifying the value of the real properties with a desired level of accuracy. For example, property analyzer 102 derives income information 108 from payroll information 150 received from payroll system 152. Payroll information 150 provides current and up-to-date information for use in identifying income information 108 for people 110.

As a result, one or more technical solutions may provide a technical effect of improved accuracy in providing information to identify the value of real properties using income information 108. As depicted, income information 108 may be derived from payroll information 150 that is obtained from payroll system 152. In this manner, income information 108 may be at least one of more accurate or more up-to-date as compared to currently used systems.

As a result, computer system 142 operates as a special purpose computer system in which property analyzer 102 in computer system 142 enables ensuring income information 108 in real property database 106 is more accurate as compared to currently used systems. Further, computer system 142 enables providing additional information for evaluating real properties 104 such as traffic flow information 154. For example, identifying traffic flow 158 into region 130, through region 130, or some combination thereof may be used to identify values of real properties 104 within region 130 with respect to different uses using traffic flow 158. Traffic flow 158 may be used in conjunction with other factors such as income information 108 to evaluate real properties 104 within region 130.

Further, traffic flow 158 through other ones of regions 112 to reach region 130 may be used to identify the values for real properties 104 through which traffic flow 158 moves to reach region 130. For example, other ones of regions 112 may be evaluated to identify a particular use based on traffic flow 158. These uses may include, for example, stores, restaurants, and other types of uses that people 110 may desire when traveling between residence locations 162 and work locations 160. For example, people 110 may wish to perform errands or other activities when traveling between residence locations 162 and work locations 160. Thus, other ones of regions 112 through which traffic flow 158 occurs with respect to region 130 may be evaluated for these and other types of uses.

In particular, property analyzer 102 transforms computer system 142 into a special purpose computer system as compared to currently available general computer systems that do not have property analyzer 102. For example, property analyzer 102 may provide a visualization of at least one of income information 108 or traffic flow information 154 in a manner that is easier for operator 144 to view and use in identifying operation 138 with respect to real property 140. Income information 108 may be displayed in different ones of regions 112 at different ones of levels 116 in hierarchy 118 on graphical user interface 136 on display system 134. The display of income information 108 at different ones of levels 116 provides different visualizations of income information 108 that enable identifying at least one of income information 108 or traffic flow information 154 for evaluating real properties 104.

Computer system 142 performs a transformation of payroll information 150 into income information 108. The changes are such that the data has a different function or a different use. Payroll information 150 is typically used for payroll purposes while the transformation into at least one of income information 108 or traffic flow information 154 allows for evaluating real properties 104.

Figure 2:
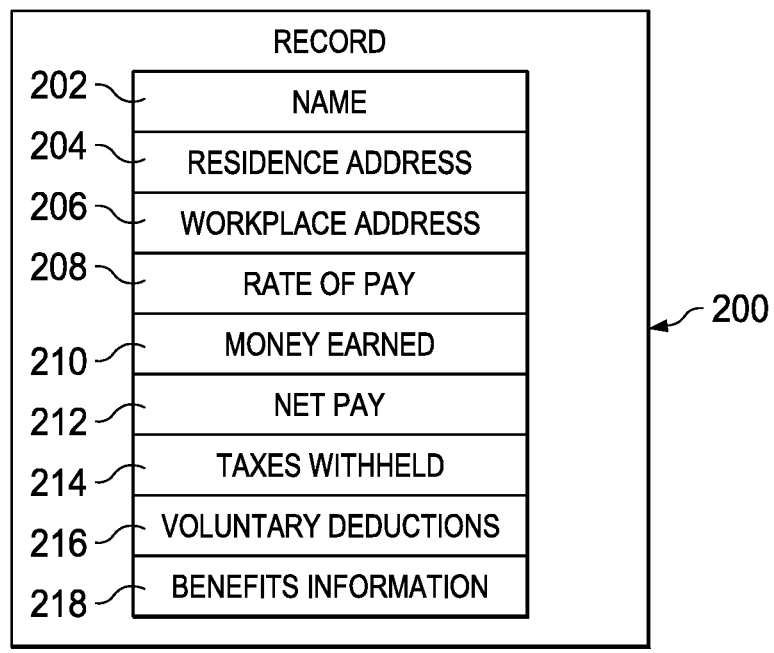
FIG. 2 is an illustration of a block diagram of a record in payroll information in accordance with an illustrative embodiment.

With reference next to FIG. 2, an illustration of a block diagram of a record in payroll information is depicted in accordance with an illustrative embodiment. In this depicted example, record 200 is an example of a record in payroll information 150 in FIG. 1.

In this illustrative example, record 200 has a number of different fields. As depicted in this illustrative example, record 200 includes name 202, residence address 204, workplace address 206, rate of pay 208, money earned 210, net pay 212, taxes withheld 214, voluntary deductions 216, and benefits information 218.

Name 202 is the name of a person for which location information is identified. In this illustrative example, name 202 is not included in income information 108 in real property database 106 in FIG. 1.

In this example, residence address 204 and workplace address 206 are locations 114, as depicted in FIG. 1, for the person. These addresses are used by property analyzer 102 in FIG. 1 to identify locations 114 in regions 112 in real property database 106 in FIG. 1. As depicted, locations 114 may include both workplace and residence addresses. In this manner, a more versatile analysis of real properties 104 in FIG. 1 may be used by having both residence address 204 and workplace address 206 used in locations 114. For example, with residence address 204 and workplace address 206, traffic flow information 154 in FIG. 1 may be identified.

Rate of pay 208 indicates how the person is paid. Rate of pay 208 may be, for example, an hourly rate, a salary, or some other manner in which the person is paid. Money earned 210 is the amount of money earned by the person in a particular payroll. Net pay 212 is the amount of pay that the person receives from a particular payroll after the money has been withheld or deducted from money earned 210.

Taxes withheld 214 is the amount of money withheld for taxes from money earned 210. Taxes withheld 214 may include at least one of state taxes or federal taxes. Voluntary deductions 216 are amounts that are deducted from money earned 210.

Benefits information 218 identifies benefits for the person. For example, benefits information 218 may include an identification of vacation days and sick days for the person. Benefits information 218 also may include retirement contributions for an individual retirement account (IRA), a 401(k) account, or some other suitable type of retirement vehicle.

Figure 3:
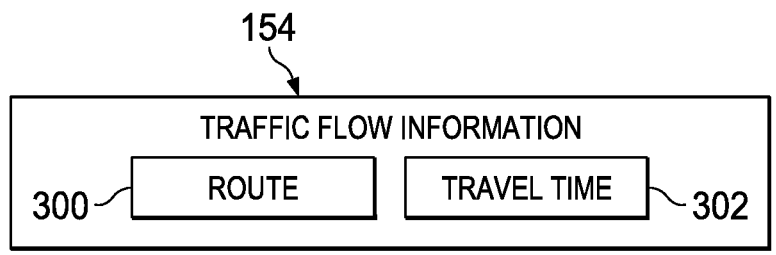
FIG. 3 is an illustration of a block diagram of traffic flow information in accordance with an illustrative embodiment.

With reference now to FIG. 3, an illustration of a block diagram of traffic flow information is depicted in accordance with an illustrative embodiment. In the illustrative examples, the same reference numeral may be used in more than one figure. This reuse of a reference numeral in different figures represents the same element in the different figures.

An example of information that may be included as part of traffic flow information 154 is shown. As depicted, traffic flow information 154 includes route 300, travel time 302, and other suitable information.

Figure 4:
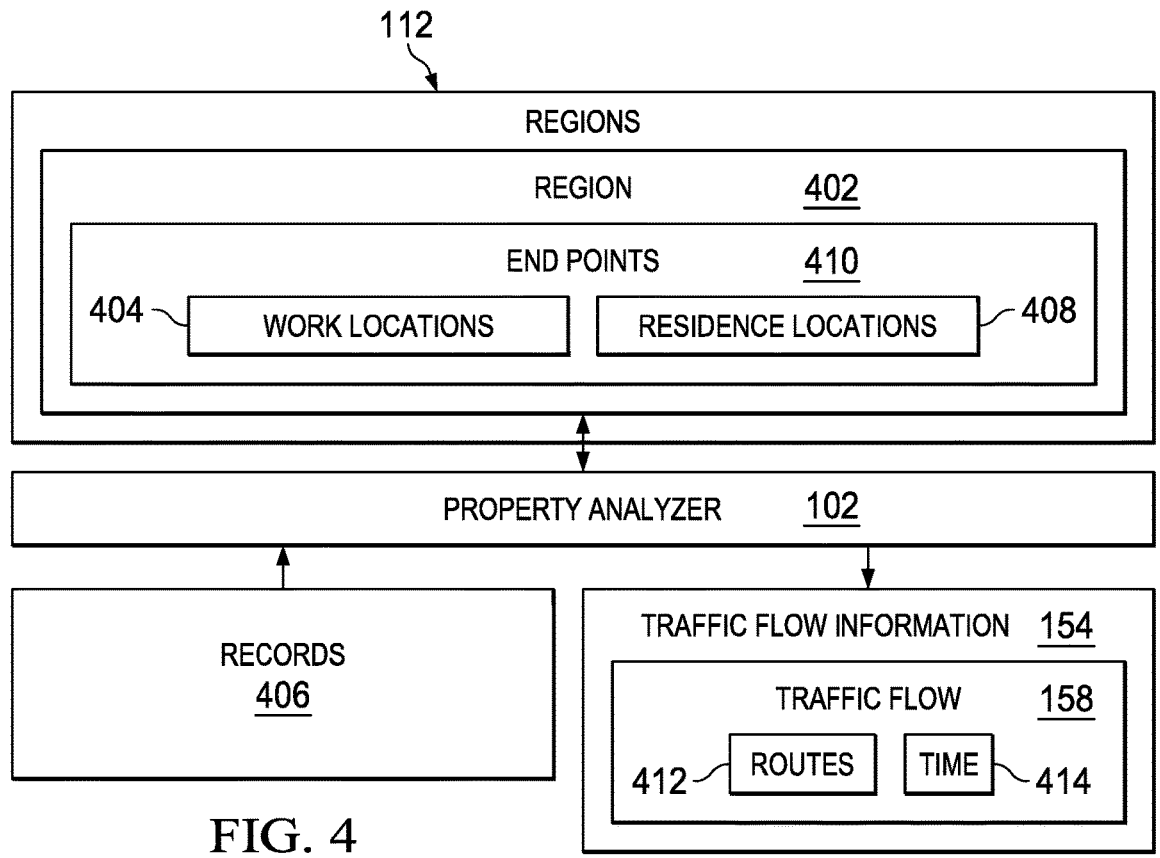
FIG. 4 is an illustration of a block diagram of dataflow used to identify traffic flow information in accordance with an illustrative embodiment.

Turning next to FIG. 4, an illustration of a block diagram of dataflow used to identify traffic flow information is depicted in accordance with an illustrative embodiment. The dataflow illustrated in FIG. 4 may be used by property analyzer 102 to identify traffic flow information 154 for region 402 in regions 112.

As depicted, property analyzer 102 identifies work locations 404 in region 402 from records 406. Property analyzer 102 also identifies residence locations 408 that correspond to work locations 404 from records 406. Record 200 in FIG. 2 is an example of a record in records 406.

Work locations 404 and residence locations 408 form end points 410 for which routes 412 may be identified. In this illustrative example, property analyzer 102 identifies routes 412 between work locations 404 in region 402 and residence locations 408.

Routes 412 are part of traffic flow 158 in traffic flow information 154. Routes 412 may be identified in a number of different ways. For example, routes 412 may be identified using a quickest route, a route that uses highways, a toll tag payment, data from mobile traffic applications, or in some other suitable manner.

In addition, property analyzer 102 may also identify time 414 for traffic flow 158. Time 414 is when traffic occurs along routes 412. Time 414 indicates at least one of time of day, day of week, or other times when traffic may occur. For example, time 414 also may indicate when traffic occurs based on time of the year changes such as holidays, summer, or other periods of time.

In this illustrative example, time 414 may be identified in a number of different ways. For example, business hours for work locations 404 may be used to predict different ones of time 414 for traffic along routes 412. Further, identification of toll tag use or other types of tags along routes 412 for people working at work locations 404 may also be used to identify time 414. As yet another example, mobile traffic applications, community-based traffic and navigation applications, and other applications may be used to identify time 414.

Figure 5:
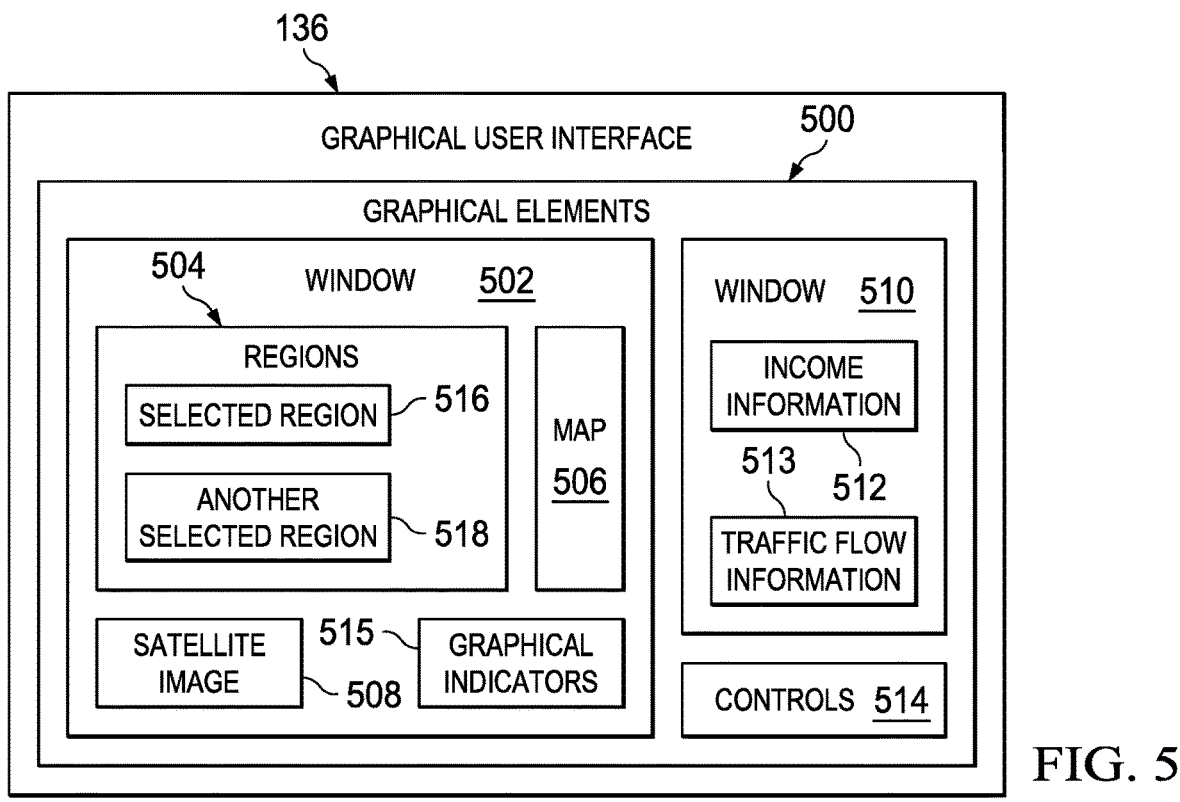
FIG. 5 is an illustration of a block diagram of a graphical user interface in accordance with an illustrative embodiment.

With reference now to FIG. 5, an illustration of a block diagram of a graphical user interface is depicted in accordance with an illustrative embodiment. In this illustrative example, an example of one implementation of graphical user interface 136 is shown. In this figure, graphical user interface 136 comprises graphical elements 500 that are used to display income information 108 in real property database 106 in FIG. 1.

In this example, window 502 in graphical elements 500 displays regions 504. Regions 504 are all of the same level in hierarchy 118 in FIG. 1 in real property database 106. The display of regions 504 takes a number of different forms. For example, regions 504 may be displayed in at least one of map 506 or satellite image 508 in window 502.

Further, graphical elements 500 also include window 510 in which at least one of income information 512 or traffic flow information 513 is displayed. Income information 512 is a visualization of at least some of income information 108 in FIG. 1 in real property database 106. Traffic flow information 513 is a visualization of at least some of traffic flow information 154 in FIG. 1. For example, at least one of income information 512 or traffic flow information 513 may be displayed in graphical form in window 510 and may include at least one of text, icons, a graphic, highlighting, bolding, color, or other types of graphical information.

Income information 512 may be derived from income information 108. In other words, calculations, comparisons, or other processing using income information 108 may be used to generate at least some of income information 512 displayed in window 502.

Further, traffic flow information 513 may also be displayed using graphical indicators 515 in window 502. Graphical indicators 515 may be used to graphically indicate traffic flow of people between different regions in regions 504. Further, an amount of the traffic flow may be indicated graphically. For example, arrows may be used for graphical indicators 515 to indicate the traffic flow. The size of the arrows indicates relative amounts of the traffic flow. Additionally, graphical indicators 515 may be selected to display additional information such as an actual amount of the traffic flow, a time when the traffic flow occurs, or other suitable types of information. This additional information may be displayed in a pop-up, a window, or some other type of graphical element in graphical elements 500.

Additionally, graphical elements 500 also include a group of controls 514. The group of controls 514 may be used to interact with graphical user interface 136. For example, the group of controls 514 may be used to change the level of regions 504 displayed in window 502. As another example, the group of controls 514 may be used to focus on selected region 516 in regions 504. In this example, income information 512 is for selected region 516 in regions 504. The group of controls 514 may be used to change focus to another selected region 518. This change in focus causes a change in the display of income information 512 to provide a visualization of income information 512 from selected region 516 to another selected region 516.

In this illustrative example, the group of controls 514 may be separate graphical elements. In some illustrative examples, one or more of the group of controls 514 may be integrated within regions 504. In other words, a selection of a region in regions 504 causes a change in the focus to that region in displaying income information 512 in window 510.

The illustration of real property information environment 100 and the different components in FIGS. 1-5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in FIG. 1, property analyzer 102 may receive payroll information 150 from one or more payroll systems in addition to or in place of payroll system 152. As another example in FIG. 1, the processing of payroll information 150 to obtain income information 108 may be performed in a number of different ways. As another example, record 200 may also include other fields in addition to or in place of the ones shown in FIG. 2. For example, record 200 also may include a field for Social Security, insurance withholdings, or other suitable information.

In another illustrative example, property analyzer 102 in FIG. 1 may run on multiple threads. In other words, different instances of property analyzer 102 may run at the same time or concurrently in computer system 142 in FIG. 1.

For example, a first instance of property analyzer 102 may run on a first thread and a second instance of property analyzer 102 may run on a second thread. These two instances of property analyzer 102 may run at substantially the same time to process payroll information 150 in FIG. 1. For example, payroll information 150 from different payroll systems may be processed in which payroll information 150 from each of the payroll systems is processed by an instance of property analyzer 102 running on a thread that is separate from other instances of property analyzer 102 running on other threads. In another example, multiple streams of payroll information 150 may be received from payroll system 152 in FIG. 1 in which each stream of payroll information 150 is processed using an instance of property analyzer 102 running on a thread for the instance.

In this manner, computer system 142 in FIG. 1 is a special purpose computer system in which payroll may be run for multiple employees at substantially the same time using multiple threads that are executed concurrently on a single processor core or multiple processor cores in a processor unit. In yet another illustrative example, income information 512 in FIG. 5 may be displayed in another type of graphical element in graphical elements 500. For example, income information 512 may be displayed in a pop-up, a tooltip, or some other suitable manner. In still other illustrative examples, income information 512 may be displayed in window 502.

In another illustrative example, in FIG. 1, real property database 106 may include other information in addition to income information 108. For example, real property database 106 may also include statistical information or other suitable types of information. As yet another example in FIG. 1, levels 116 for regions 112 may have a hierarchical structure other than that of census information as shown in the illustrative examples. For example, regions 112 may be based on postal codes, area codes, latitude and longitude blocks, or other suitable types of demarcations for physical areas of land.

Turning now to FIG. 6, an illustration of a record is depicted in accordance with an illustrative embodiment. In this depicted example, record 600 is a pay statement for an employee. Record 600 is an example of one implementation for record 200 in FIG. 2.

As depicted, record 600 is a pay statement for Jane E. Doe 602 with residence address 604 and workplace address 606. Record 600 also shows rate of pay 608 and money earned 610. Record 600 also includes deductions 612 and net pay 614. Deductions 612 include statutory deductions 615 in the form of federal income tax 616, Social Security tax 618, Medicare tax 620, state income tax 622, and city tax 624 in this example. Other deductions 626 are present in deductions 612 and include long-term disability (LTD) 628, personal plans 630, personal accident 632, and 401 k 634. Other benefits and information 636 are also shown in record 600. Other benefits and information 636 include 401 k 638, hours 640, commissions 642, vacation 644, bereavement 646, holiday 648, and pay notice 650.

Figure 7:
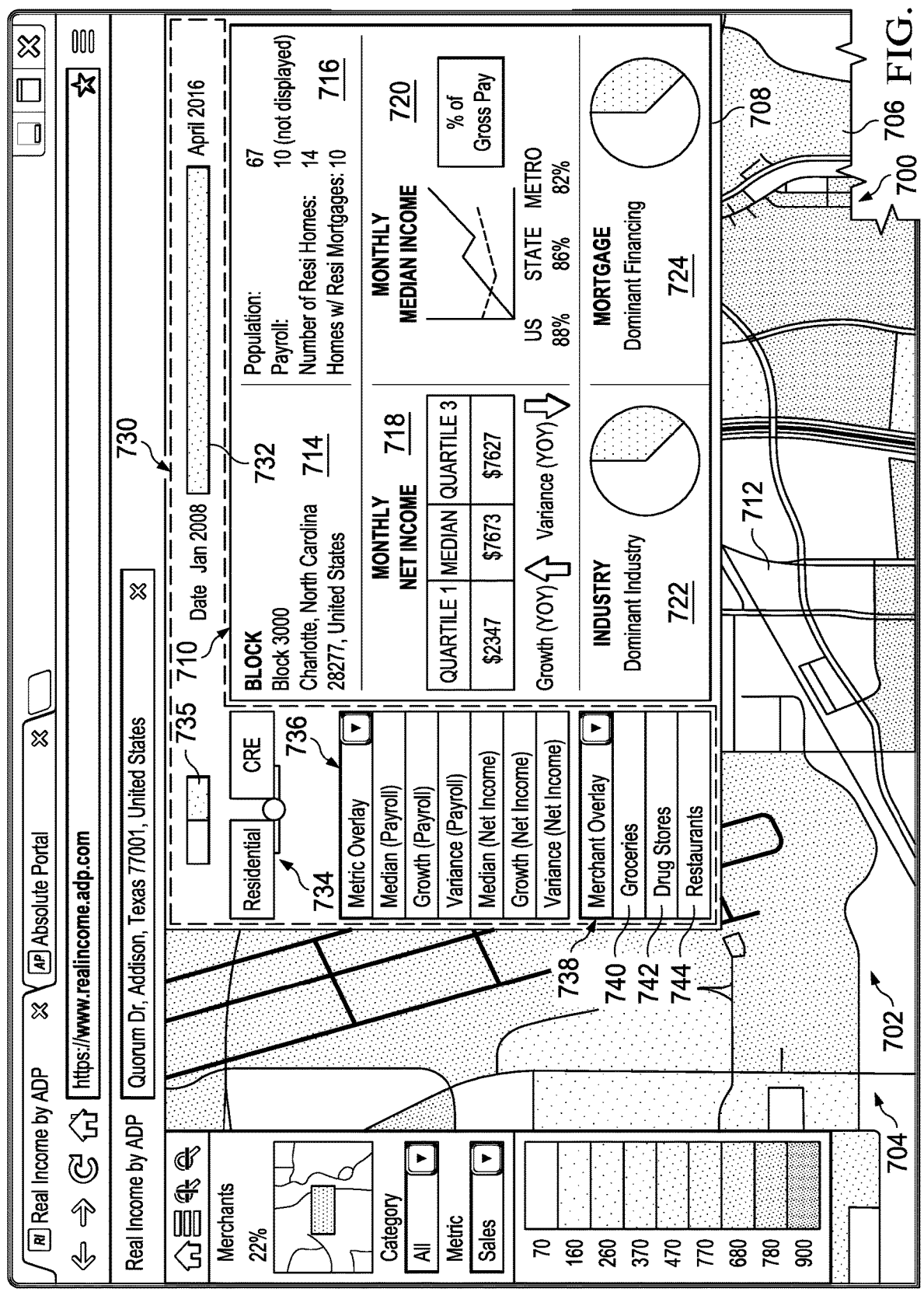
FIG. 7 is an illustration of a graphical user interface with regions and information about the regions in accordance with an illustrative embodiment.

With reference next to FIG. 7, an illustration of a graphical user interface with regions and information about the regions is depicted in accordance with an illustrative embodiment. In this depicted example, graphical user interface 700 is an example of an implementation of graphical user interface 136 shown in block form in FIG. 1 and FIG. 3.

In this illustrative example, graphical user interface 700 includes window 702 in which regions 704 are displayed on map 706. In this example, regions 704 represent blocks in levels or regions in a hierarchy of levels.

Further, window 708 is displayed in which income information 710 is displayed for region 712, which is a particular block in this example. Section 714 shows an identification of the blocks represented by region 712. Section 716 shows information about people in region 712. This information includes, for example, the number of people, the number of people represented in a payroll providing the income information, the number of resident homes, and the number of resident homes with mortgages.

Section 718 shows a monthly net income for region 712. Section 720 shows a monthly medium income for region 712. Section 722 shows information about the industry, and section 724 shows information about mortgages in region 712. As depicted, monthly net income in section 718, monthly medium income in section 720, industry in section 722, and mortgage in section 724 are examples of metrics for region 712.

Additionally, controls 730 are displayed. Slider 732 in controls 730 is used to change the date of income information displayed in window 708. Control 734 in controls 730 is used to select between income information based on residential addresses and income information based on work addresses.

Level selector 735 in controls 730 allows for changing levels in the hierarchy. For example, level selector 735 may be manipulated to change regions 704 from census blocks to some other level such as block groups, census tract, county, or some other suitable level.

Metric selector 736 in controls 730 allows for selecting metrics that are displayed in window 708. Merchant overlay 738 is an example of additional information that may be displayed on map 706 in addition to regions 704. Information such as groceries 740, drug stores 742, and restaurants 744 may be used in performing operations with respect to region 712 and other regions in regions 704.

Figure 8:
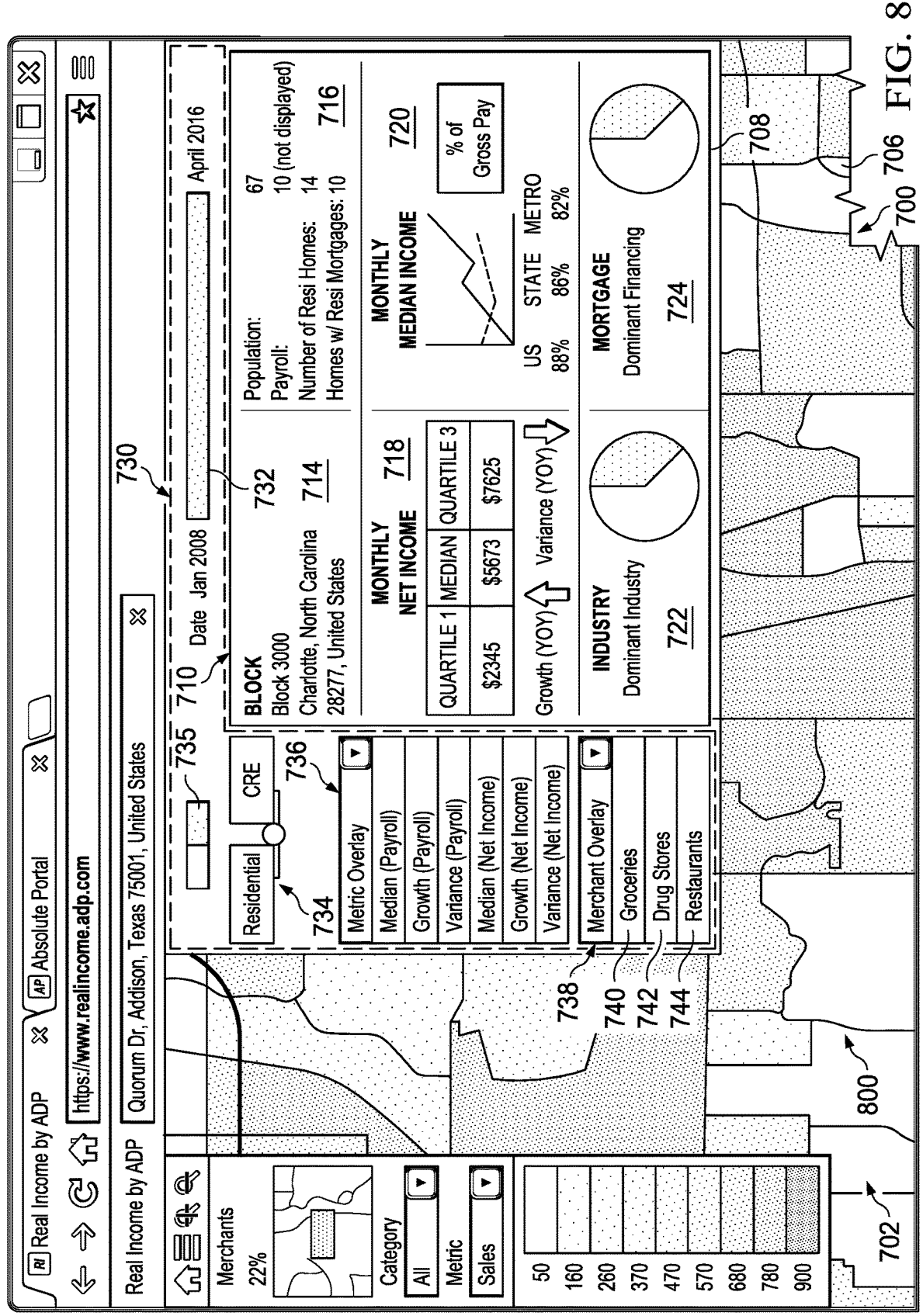
FIG. 8 is another illustration of a graphical user interface with regions and information about the regions in accordance with an illustrative embodiment.

With reference now to FIG. 8, another illustration of a graphical user interface with regions and information about the regions is depicted in accordance with an illustrative embodiment. In this depicted example, graphical user interface 700 now displays regions 800 on map 706 in window 702. Regions 800 represent block groups, which are on a level higher in the hierarchy of regions than regions 704 that represent blocks in FIG. 7. Window 708 now displays income information, metrics, and other information on a block group level for regions 800.

Figure 9:
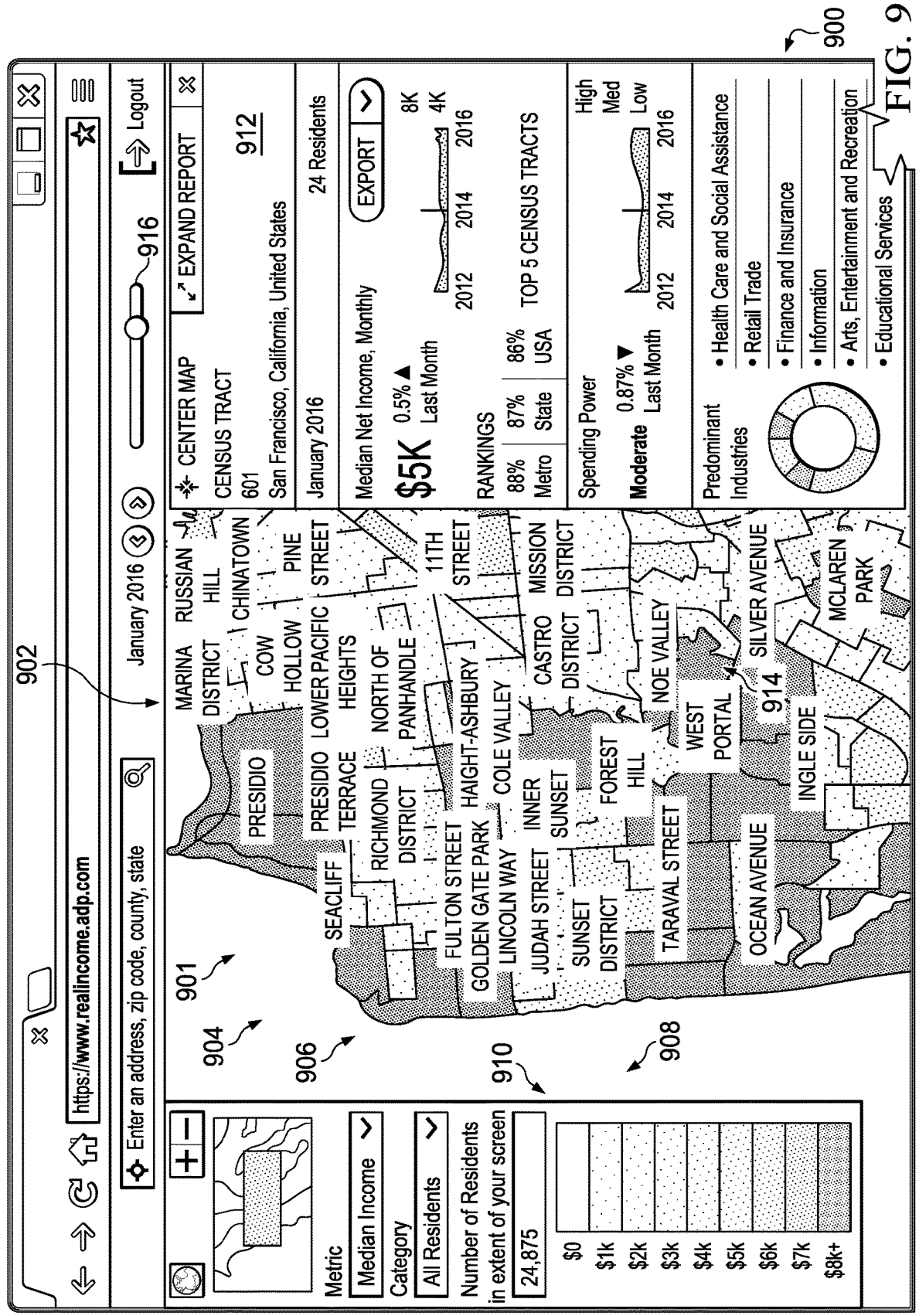
FIG. 9 is yet another illustration of a graphical user interface with regions and information about the regions in accordance with an illustrative embodiment.

Turning now to FIG. 9, yet another illustration of a graphical user interface with regions and information about the regions is depicted in accordance with an illustrative embodiment. In this depicted example, graphical user interface 900 is an example of one implementation of graphical user interface 136 shown in block form in FIG. 1 and FIG. 3.

In this example, section 901 in window 902 displays regions 904 on map 906. Regions 904 represent census tracts in this illustrative example. Census tracts are on a higher level in the hierarchy than block groups as displayed in FIG. 8.

In this illustrative example, color is used in regions 904 to identify medium income for different census tracts. Key 908 in section 910 indicates the average income for a particular color used in regions 904. Additionally, section 912 in window 902 displays information for residents in region 914 in regions 904. Further, control 916 is present in window 902. Control 916 is a slider that allows the selection of information for regions 904 to be changed to different dates.

Figure 10:
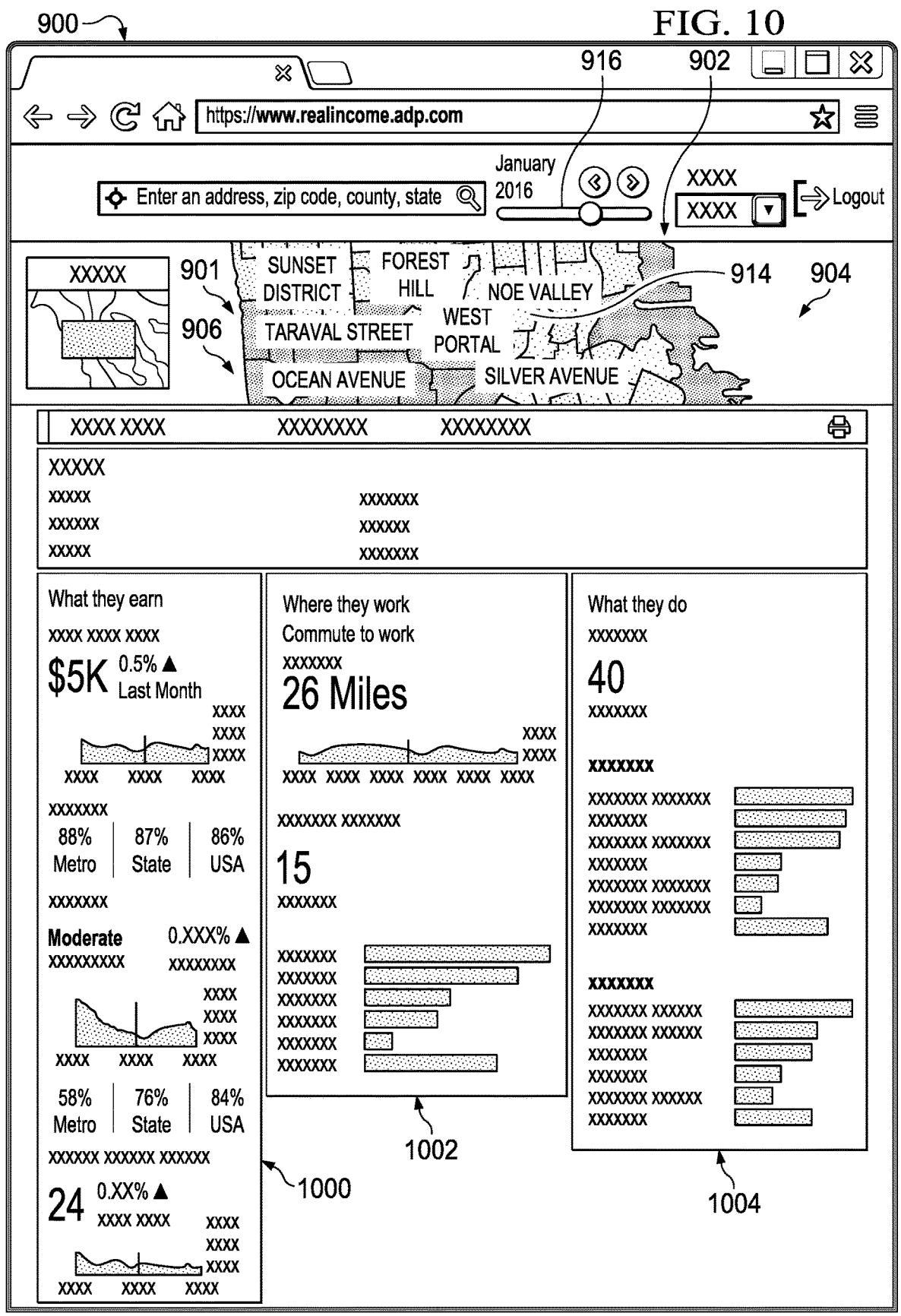
FIG. 10 is still another illustration of a graphical user interface with regions and information about the regions in accordance with an illustrative embodiment.

With reference next to FIG. 10, still another illustration of a graphical user interface with regions and information about the regions is depicted in accordance with an illustrative embodiment. In this example, section 1000 illustrates earnings for residents in region 914. Section 1002 shows where residents in region 914 work. Section 1004 show the jobs held by residents in region 914.

Figure 11:
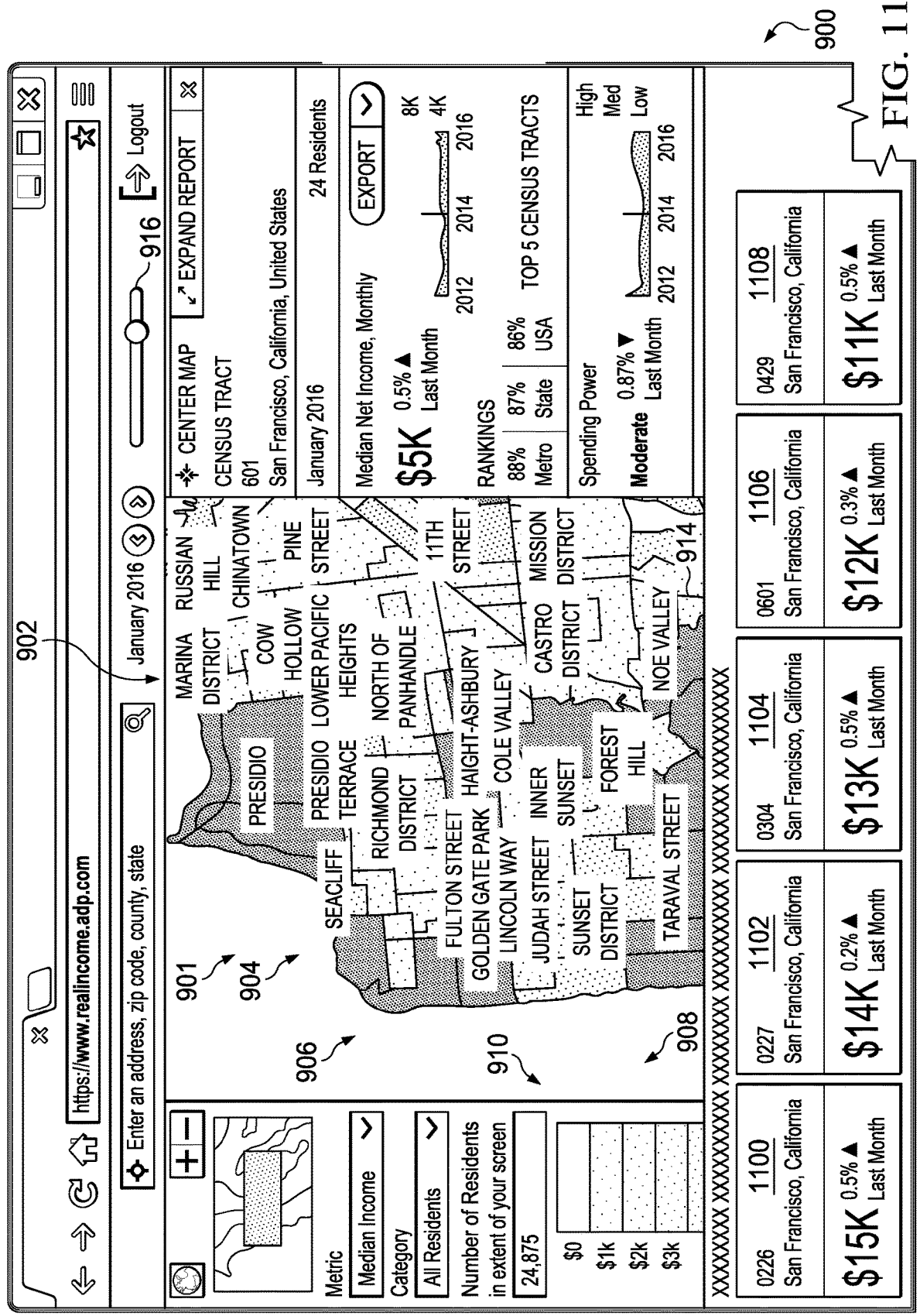
FIG. 11 is yet another illustration of a graphical user interface with regions and information about the regions in accordance with an illustrative embodiment.

Turning now to FIG. 11, yet another illustration of a graphical user interface with regions and information about the regions is depicted in accordance with an illustrative embodiment. In the illustrative example, section 1100, section 1102, section 1104, section 1106, and section 1108 in window 902 show information for the top five regions in regions 904. In this example, information in the form of net income for residents is shown for the top five census tracts for a city.

Figure 12:
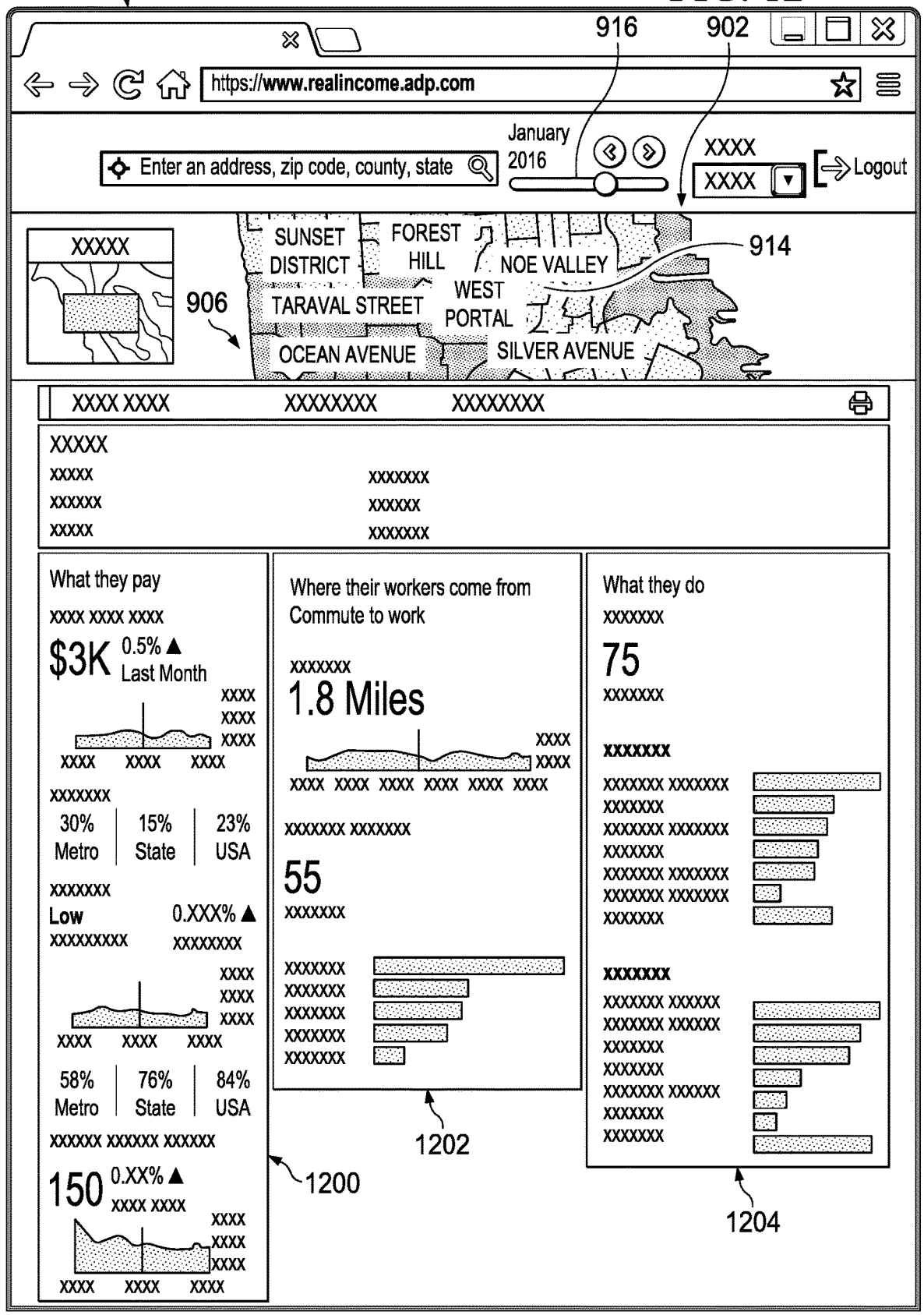
FIG. 12 is another illustration of a graphical user interface with regions and information about the regions in accordance with an illustrative embodiment.

With reference to FIG. 12, another illustration of a graphical user interface with regions and information about the regions is depicted in accordance with an illustrative embodiment. In this example, information for businesses is shown instead of residents in window 902 in graphical user interface 900.

In this example, information is shown for businesses in region 914. This information is shown in section 1200, section 1202, and section 1204 in window 902. As depicted, section 1200 shows net pay by businesses. Section 1202 shows how far employees commute to work in region 914. Section 1204 shows the industries and jobs in region 914.

Figure 13:
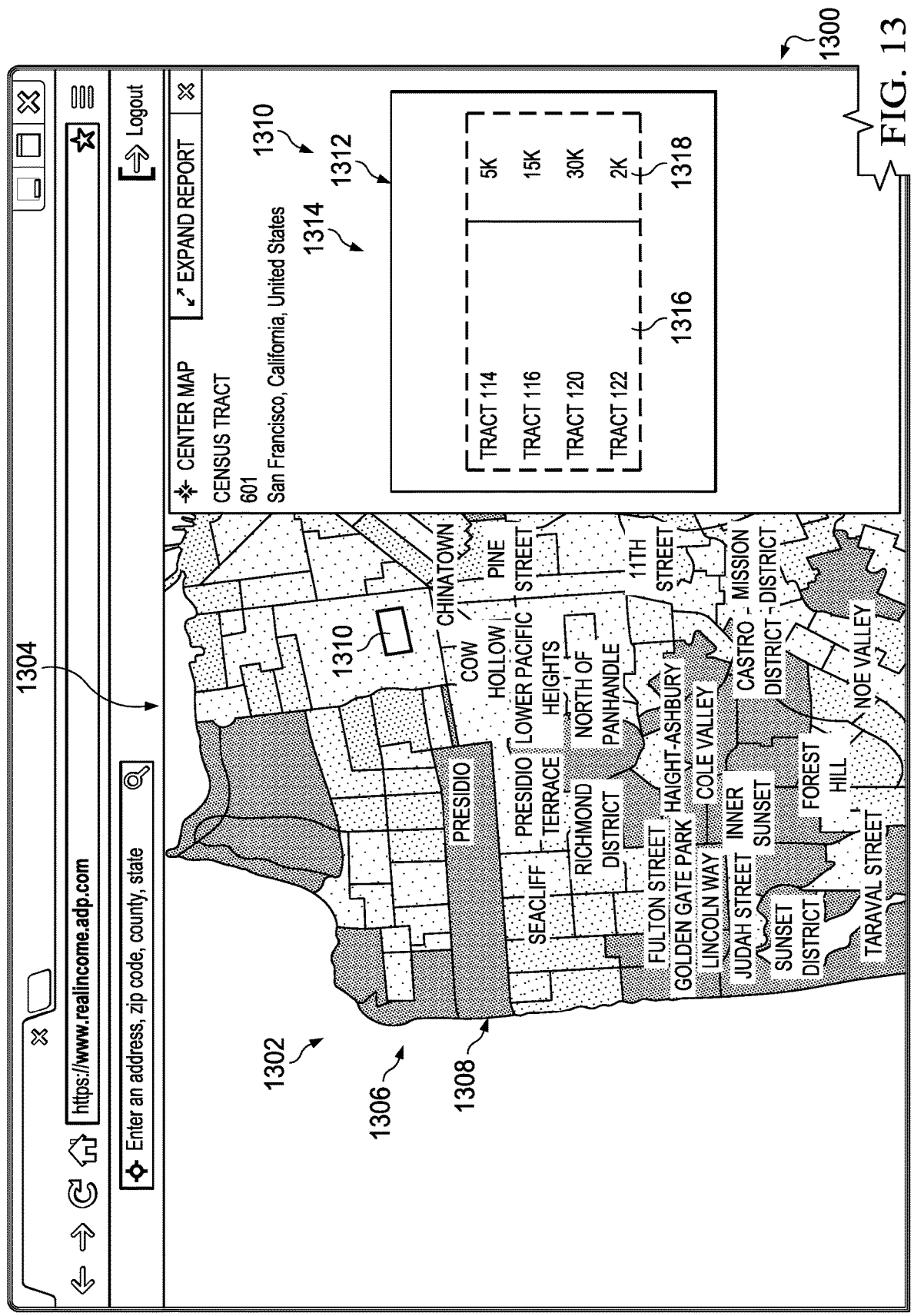
FIG. 13 is an illustration of a graphical user interface with regions and traffic flow information about the regions in accordance with an illustrative embodiment.

With reference next to FIG. 13, an illustration of a graphical user interface with regions and traffic flow information about the regions is depicted in accordance with an illustrative embodiment. In this depicted example, graphical user interface 1300 is an example of one implementation of graphical user interface 136 shown in block form in FIG. 1 and FIG. 3.

In this illustrative example, section 1302 in window 1304 displays regions 1306 on map 1308. Regions 1306 represent census tracts in this illustrative example. Census tracts are on a higher level in the hierarchy than block groups as displayed in FIG. 8.

Region 1310 in regions 1306 has been selected in this example. The selection of region 1310 results in traffic flow information 1312 being displayed in section 1314. In this illustrative example, traffic flow information 1312 identifies regions 1316 and traffic flow 1318 from regions 1316 into region 1310.

Figure 14:
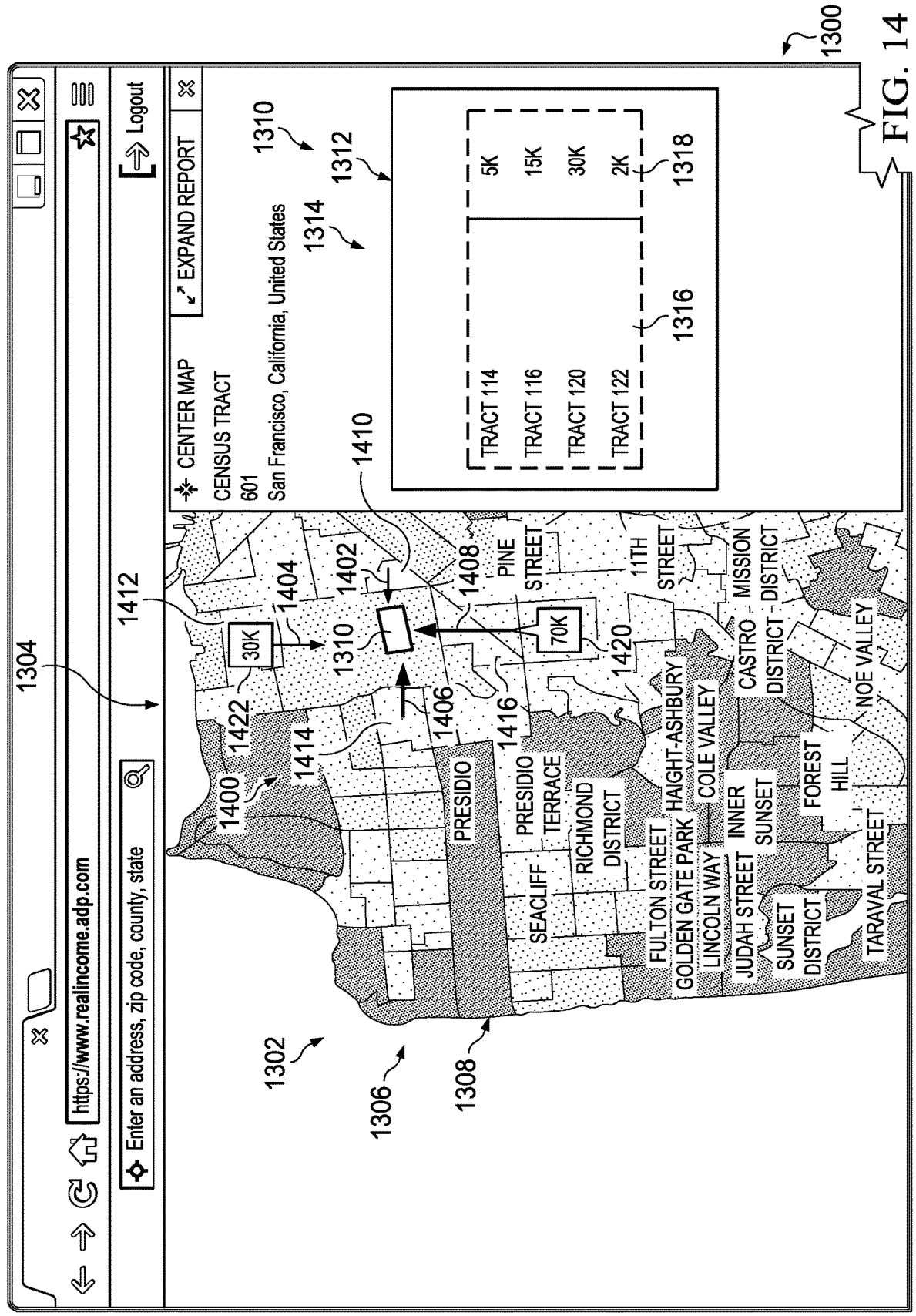
FIG. 14 is another illustration of a graphical user interface with regions and traffic flow information about the regions in accordance with an illustrative embodiment.

With reference next to FIG. 14, another illustration of a graphical user interface with regions and traffic flow information about the regions is depicted in accordance with an illustrative embodiment. In this illustrative example, traffic flow information 1400 for region 1310 is shown using graphical indicators in the form of arrow 1402, arrow 1404, arrow 1406, and arrow 1408. Arrow 1402 indicates the traffic flow from region 1410 into region 1310; arrow 1404 indicates the traffic flow from region 1412 into region 1310; arrow 1406 indicates the traffic flow from region 1414 into region 1310; and arrow 1408 indicates the traffic flow from region 1416 into region 1310.

In this illustrative example, the thicknesses of the arrows indicate an amount of the traffic flow. For example, the traffic flow from region 1414 into region 1310 is greater than the traffic flow from region 1410 into region 1310 as indicated by arrow 1406 and arrow 1402, respectively.

Further, additional traffic flow information may be displayed by selecting one of the arrows. For example, selection of arrow 1408 results in pop-up 1420 to be displayed. Pop-up 1420 shows that the traffic flow is 70 k. As another example, the selection of arrow 1404 causes the display of pop-up 1422 to be displayed. Pop-up 1422 shows the traffic flow is 30 k in this illustrative example. Other information also may be shown in addition to or in place of the amount of the traffic flow. For example, traffic information such as times for the traffic flow may also be shown in addition to or in place of the amount of the traffic flow.

The illustrations of the graphical user interfaces in FIGS. 7-14 are examples of implementations for graphical user interface 136 shown in block form in FIG. 1 and in FIG. 3 and are not meant to limit the manner in which graphical user interface 136 may be implemented in other illustrative examples. For example, four arrows are shown to indicate traffic flow information 1400. Other numbers of arrows may be present depending on the traffic flow into region 1310. For example, if traffic flow occurs from seven of regions 1306 into region 1310, seven arrows would be displayed. If traffic flow occurs from 15 of regions 1306 into region 1310, 15 arrows would be displayed.

As another example, some graphical user interfaces may show a combination of income information and traffic flow information. As yet another example, the graphical user interfaces may also include zoning information about regions, types of public transportation, or other suitable information about the regions.

Figure 15:
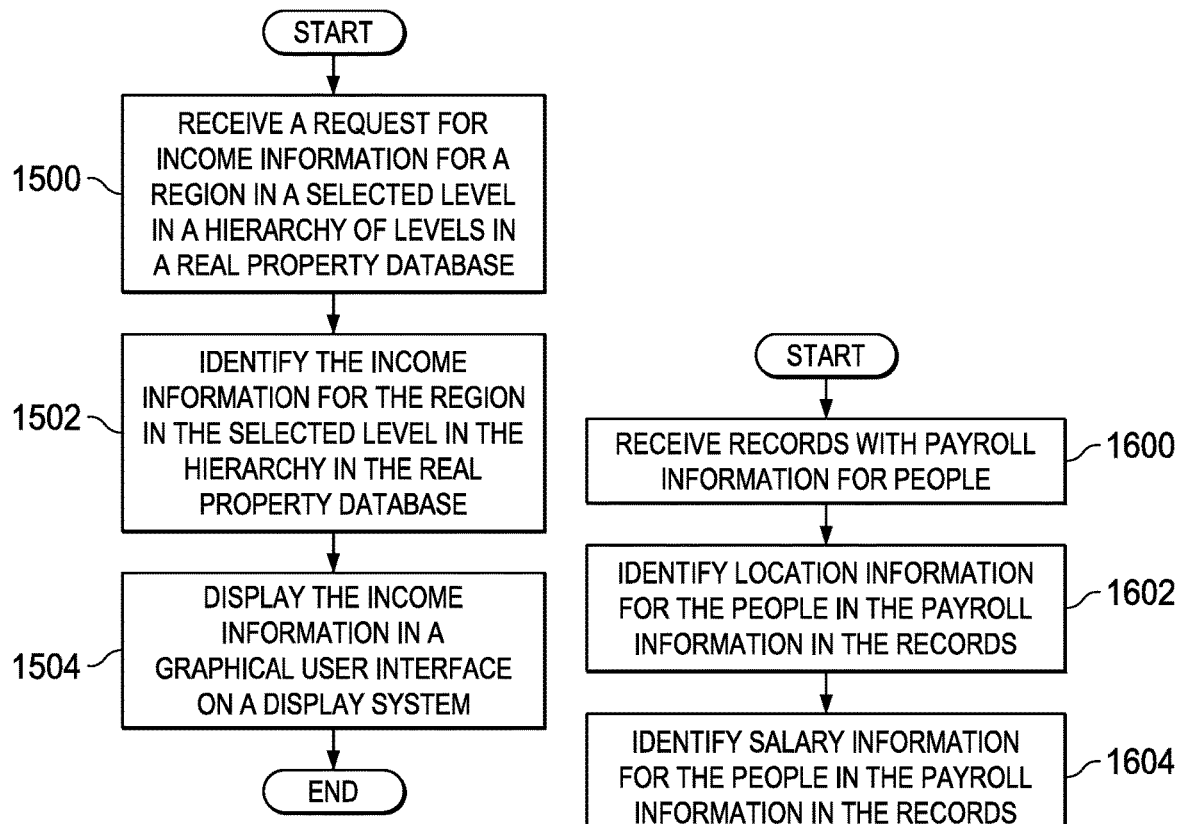
FIG. 15 is an illustration of a flowchart of a process for analyzing real property in accordance with an illustrative embodiment.

Turning next to FIG. 15, an illustration of a flowchart of a process for analyzing real property is depicted in accordance with an illustrative embodiment. The process in FIG. 15 may be implemented in property analyzer 102 in FIG. 1.

The process begins by receiving a request for income information for a region in a selected level in a hierarchy of levels in a real property database (step 1500). Next, the process identifies the income information for the region in the selected level in the hierarchy in the real property database (step 1502).

The process then displays the income information in a graphical user interface on a display system (step 1504) with the process terminating thereafter. The income information displayed in the graphical user interface on the display system enables performing an operation with respect to the real property.

Figure 16:
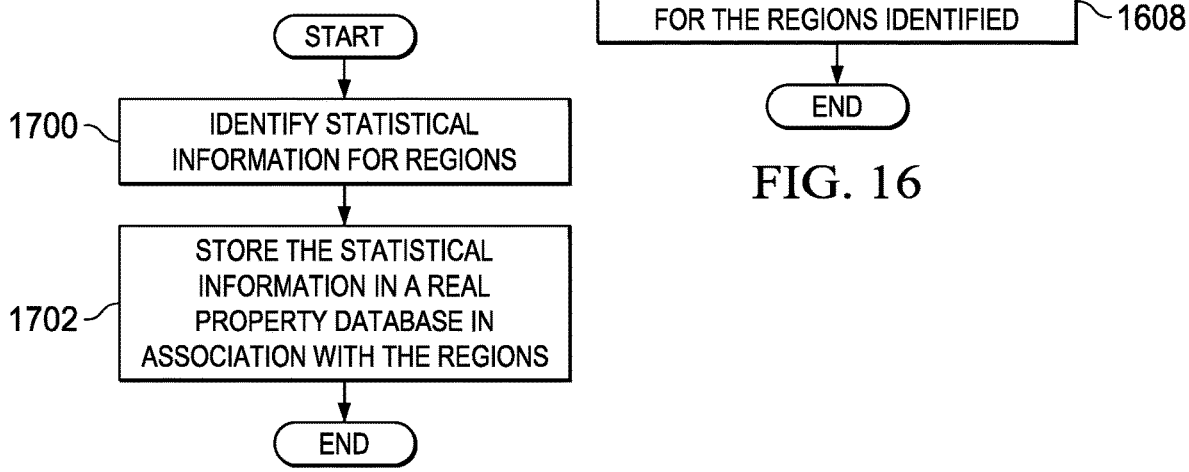
FIG. 16 is an illustration of a flowchart of a process for updating income information in a real property database in accordance with an illustrative embodiment.

With reference now to FIG. 16, an illustration of a flowchart of a process for updating income information in a real property database is depicted in accordance with an illustrative embodiment. The process in FIG. 16 may be implemented in property analyzer 102 in FIG. 1 to update real property database 106 in FIG. 1.

The process begins by receiving records with payroll information for people (step 1600). In this example, the records in step 1600 are for a payroll processed for a group of organizations. An organization in the group of organizations may be selected from one of a company, a partnership, a charity, an educational group, a social group, a team, a city, a government agency, or some other suitable organization.

The process then identifies location information for the people in the payroll information in the records (step 1602). The location information is selected from at least one of a residence address or a workplace address in step 1602.

Next, the process identifies salary information for the people in the payroll information in the records (step 1604). The payroll information is selected from at least one of a rate of pay, money earned, a net pay, taxes, voluntary deductions, benefits information, retirement contributions, or other suitable information.

The process then maps locations of the people into regions in a real property database (step 1606). The process updates the income information for the regions identified (step 1608) with the process terminating thereafter. The income information in the regions is updated using the location information and the salary information.

In the illustrative example, the income information for each region is identified using the payroll information. For example, the income information for a region in a higher level in the hierarchy is identified using the payroll information for the people in that region. In another example, the income information for a selected region may be calculated using the income information already calculated for the regions that are lower in the hierarchy that are within the selected region.

Figure 17:
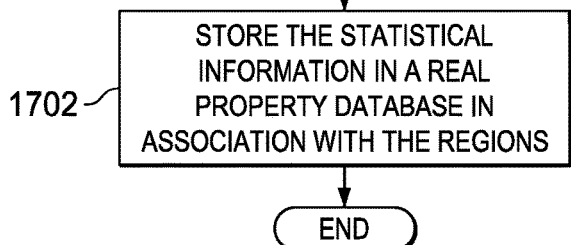
FIG. 17 is an illustration of a flowchart of a process for updating a real property database with statistical information in accordance with an illustrative embodiment.

With reference next to FIG. 17, an illustration of a flowchart of a process for updating a real property database with statistical information is depicted in accordance with an illustrative embodiment. The process in this flowchart may be implemented in property analyzer 102 to add statistical information to real property database 106 in FIG. 1.

The process identifies statistical information for regions (step 1700). The statistical information for a region may include, for example, at least one of demographic information, a monthly net income, a monthly medium income, age, a number of residential homes, a number of commercial properties, a dominant industry, a dominant financial institution, or other suitable information about the region.

The process stores the statistical information in a real property database in association with the regions (step 1702). Storing the statistical information associated with the regions may be performed by using pointers, indexes, or other mechanisms for associating pieces of information with each other. The process terminates thereafter.

Figure 18:
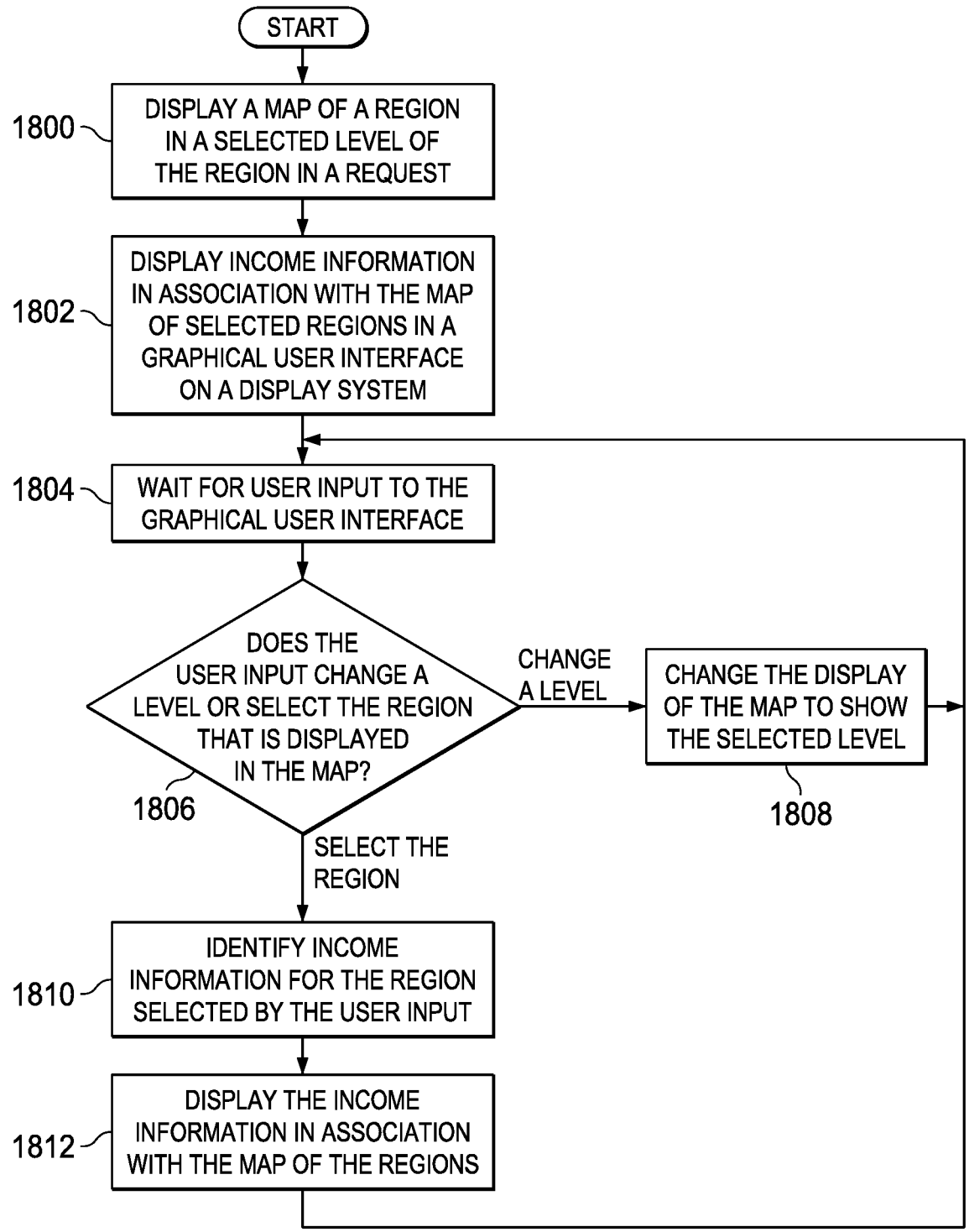
FIG. 18 is an illustration of a flowchart of a process for displaying income information in a graphical user interface in accordance with an illustrative embodiment.

Turning to FIG. 18, an illustration of a flowchart of a process for displaying income information in a graphical user interface is depicted in accordance with an illustrative embodiment. The process illustrated in FIG. 18 may be implemented in property analyzer 102 in FIG. 1 to display income information 108 in graphical user interface 136 on display system 134 in FIG. 1.

The process begins by displaying a map of a region in a selected level of the region in a request (step 1800). The process displays income information in association with the map of selected regions in a graphical user interface on a display system (step 1802).

The process then waits for user input to the graphical user interface (step 1804). When the user input is received, a determination is made as to whether the user input changes a level or selects the region that is displayed in the map (step 1806). If the user input changes the level, the process changes the display of the map to show the selected level (step 1808). The process then returns to step 1804.

With reference again to step 1806, if the user input selects the region, the process identifies income information for the region selected by the user input (step 1810). The process then displays the income information in association with the map of the regions (step 1812) with the process returning to step 1804.

With reference next to FIG. 19, an illustration of a flowchart of a process for analyzing real property is depicted in accordance with an illustrative embodiment. The process in FIG. 19 may be implemented in property analyzer 102 in FIG. 1.

The process begins by receiving a request for traffic flow information for a workforce for a region in a selected level in a hierarchy of levels in a real property database (step 1900). The process then identifies the traffic flow information for the workforce for the region in the selected level in the hierarchy of levels in the real property database (step 1902).

Next, the process displays the traffic flow information for the workforce in a graphical user interface on a display system (step 1904) with the process terminating thereafter. The traffic flow information for the workforce displayed in the graphical user interface on the display system enables performing an operation with respect to real property. The operation may include identifying a value of the real property in the region, uses for the real property in the region, uses for the real property in other regions through which traffic flows to reach the region, or other suitable operations.

With reference next to FIG. 20, an illustration of a flowchart of a process for updating a real property database is depicted in accordance with an illustrative embodiment. The process in FIG. 20 may be implemented in property analyzer 102 in FIG. 1 to update traffic flow information 154 in real property database 106 in FIG. 1.

The process begins by receiving records with payroll information for people in a workforce (step 2000). Next, the process identifies location information for the people in the records (step 2002). The process also identifies traffic flow using the location information for the people in the records (step 2004).

The process then maps the locations of the people into regions in a real property database (step 2006). Next, the process updates traffic flow information for the regions identified (step 2008) with the process terminating thereafter. Thus, the traffic flow information in the regions is updated using the location information.

In FIG. 21, an illustration of a flowchart of a process for displaying traffic flow information in a graphical user interface is depicted in accordance with an illustrative embodiment. The process illustrated in FIG. 21 may be implemented in property analyzer 102 in FIG. 1 to display traffic flow information 154 in graphical user interface 136 on display system 134 in FIG. 1.

The process begins by displaying a map of regions in a selected level for a region in a request (step 2100). Next, the process displays traffic flow information in association with the map of the regions in a graphical user interface on a display system (step 2102). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the process in FIG. 15 may also display other information in addition to income information in step 1504. For example, the process may also display the statistical information for the region in the graphical user interface on the display system. As another example, the process illustrated in FIG. 18 may be implemented to display traffic flow information in addition to or in place of income information.

Figure 22:
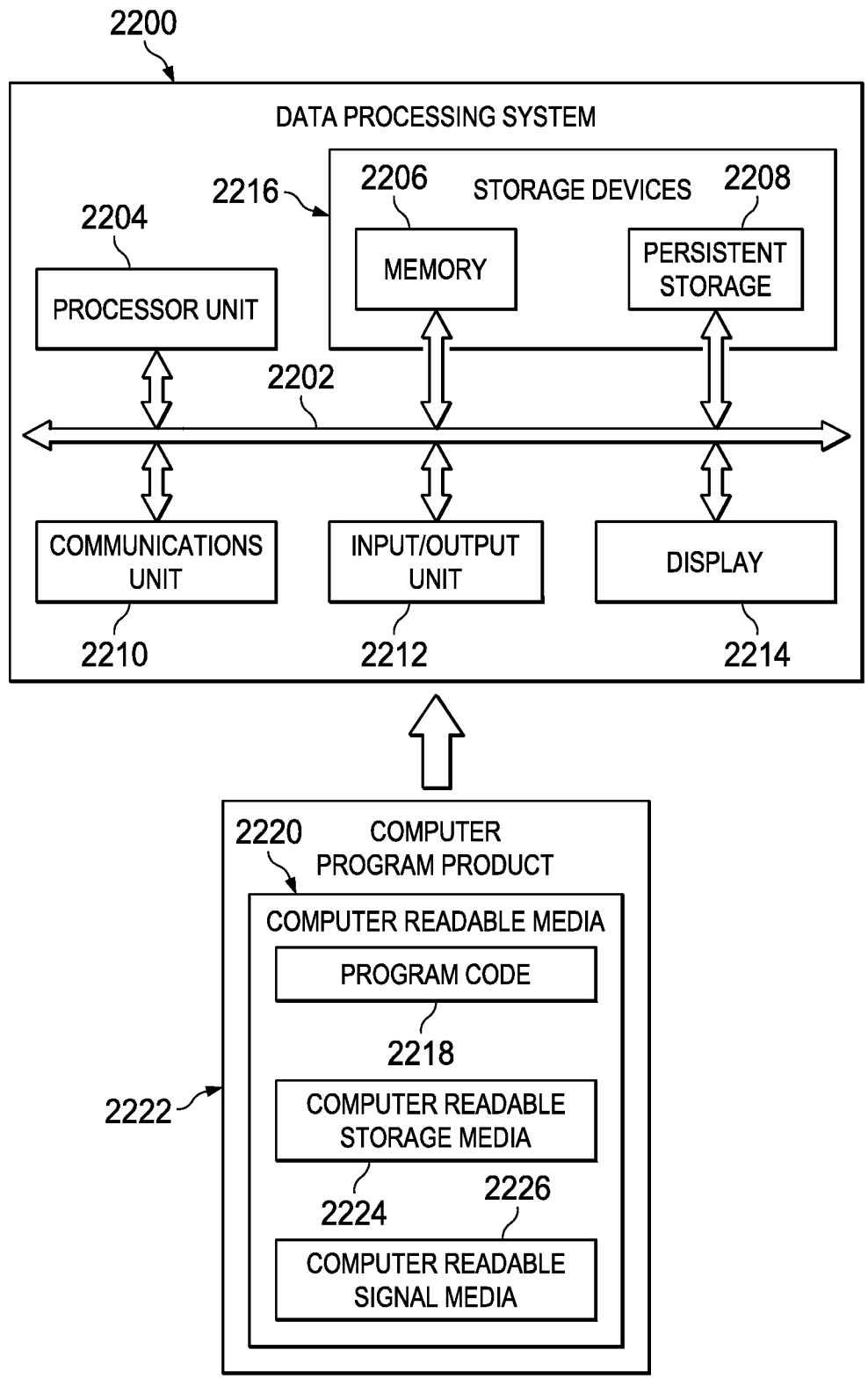
FIG. 22 is an illustration of a block diagram of a data processing system in accordance with an illustrative embodiment.

Turning now to FIG. 22, an illustration of a block diagram of a data processing system is depicted in accordance with an illustrative embodiment. Data processing system 2200 may be used to implement computer system 142 in FIG. 1. In this illustrative example, data processing system 2200 includes communications framework 2202, which provides communications between processor unit 2204, memory 2206, persistent storage 2208, communications unit 2210, input/output (I/O) unit 2212, and display 2214. In this example, communications framework 2202 may take the form of a bus system.

Processor unit 2204 serves to execute instructions for software that may be loaded into memory 2206. Processor unit 2204 may be a number of processors, a multi-processor core, or some other type of processor, depending on the particular implementation.

Memory 2206 and persistent storage 2208 are examples of storage devices 2216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2216 may also be referred to as computer readable storage devices in these illustrative examples. Memory 2206, in these examples, may be, for example, a random access memory or any other suitable volatile or non-volatile storage device. Persistent storage 2208 may take various forms, depending on the particular implementation.

For example, persistent storage 2208 may contain one or more components or devices. For example, persistent storage 2208 may be a hard drive, a solid state hard drive, a flash memory, a rewritable optical disk, a rewritable magnetic tape, or some combination of the above. The media used by persistent storage 2208 also may be removable. For example, a removable hard drive may be used for persistent storage 2208.

Communications unit 2210, in these illustrative examples, provides for communications with other data processing systems or devices. In these illustrative examples, communications unit 2210 is a network interface card.

Input/output unit 2212 allows for input and output of data with other devices that may be connected to data processing system 2200. For example, input/output unit 2212 may provide a connection for user input through at least one of a keyboard, a mouse, or some other suitable input device. Further, input/output unit 2212 may send output to a printer. Display 2214 provides a mechanism to display information to a user.

Instructions for at least one of the operating system, applications, or programs may be located in storage devices 2216, which are in communication with processor unit 2204 through communications framework 2202. The processes of the different embodiments may be performed by processor unit 2204 using computer-implemented instructions, which may be located in a memory, such as memory 2206.

These instructions are referred to as program code, computer usable program code, or computer readable program code that may be read and executed by a processor in processor unit 2204. The program code in the different embodiments may be embodied on different physical or computer readable storage media, such as memory 2206 or persistent storage 2208.

Program code 2218 is located in a functional form on computer readable media 2220 that is selectively removable and may be loaded onto or transferred to data processing system 2200 for execution by processor unit 2204. Program code 2218 and computer readable media 2220 form computer program product 2222 in these illustrative examples. In one example, computer readable media 2220 may be computer readable storage media 2224 or computer readable signal media 2226. In these illustrative examples, computer readable storage media 2224 is a physical or tangible storage device used to store program code 2218 rather than a medium that propagates or transmits program code 2218.

Alternatively, program code 2218 may be transferred to data processing system 2200 using computer readable signal media 2226. Computer readable signal media 2226 may be, for example, a propagated data signal containing program code 2218. For example, computer readable signal media 2226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2200 are not meant to provide architectural limitations to the manner in which different embodiments may be implemented. The different illustrative embodiments may be implemented in a data processing system including components in addition to or in place of those illustrated for data processing system 2200. Other components shown in FIG. 22 can be varied from the illustrative examples shown. The different embodiments may be implemented using any hardware device or system capable of running program code 2218.

Thus, the illustrative embodiments provide a method and apparatus for evaluating real properties. One or more technical solutions are present that overcome a technical problem with identifying a value of the real properties with a desired level of accuracy. For example, a property analyzer derives income information from payroll information received from a payroll system. The use of the payroll information provides current and up-to-date information for use in identifying the income information.

As a result, one or more technical solutions may provide a technical effect of improved accuracy in providing information to identify the value of the real properties using the income information. As depicted, the income information may be derived from the payroll information obtained from the payroll system. In this manner, the income information may be at least one of more accurate or more up-to-date as compared to currently used systems.

Further, the illustrative embodiments provide a method and apparatus for visualizing the income information. In the depicted examples, regions of land may be displayed at different levels in a hierarchy. The income information may be displayed for different regions.

The accuracy of the information, the visualization provided, or both enable valuing the real properties more accurately than with currently used systems. In this manner, operations may be performed with respect to the real properties.

Further, an evaluation of the real property also may be made using traffic flow information in addition to or in place of the income information. The traffic flow information may be used to identify information such as demographics of a workforce in a region. For example, the demographics may be identified from residence locations in addition to other information. With the identification of the traffic flow, operations with respect to uses of the real property may also be identified. These uses may include identifying locations for stores, restaurants, fitness centers, and other types of uses. Further, the use of the real property also may include identifying the real property that may be used for roads or other thoroughfares based on traffic flow information.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer system comprising:
   a hardware processor; and
   a display system in communication with the hardware processor, the display system comprising a graphical user interface;
   a real property database comprising traffic flow information for a workforce in regions based on locations of people in the workforce, wherein the regions are organized into levels in a hierarchy in which a parent region in a first level in the levels is comprised of child regions in a second level in the levels that is below the first level in the hierarchy; and
   a property analyzer in communication with the display system and the real property database, the property analyzer implemented in software, hardware, firmware, or a combination thereof and configured to analyze and value real property by:
      receiving, using the property analyzer, records with payroll information for the people in the workforce;
      transforming, using the property analyzer, the payroll information into income information;
      identifying, using the property analyzer, location information, including work locations and residence locations, from the payroll information for the people in the workforce;
      deriving, using the property analyzer, routes between the work locations and the residence locations for the people in the workforce;
      identifying, using the property analyzer, traffic flow along the routes by accumulating the derived routes between the work locations and the residence locations for the people in the workforce;
      controlling using a graphical user interface of the display system a selected level in a hierarchy of levels in a real property database to define a region;
      receiving, using the property analyzer, a request for the traffic flow information for the workforce in the region defined by the selected level in the hierarchy of levels in the real property database;
      identifying, using the property analyzer, the traffic flow information for the workforce in the region defined by the selected level in the hierarchy in the real property database;
      identifying, using the property analyzer, values of real properties along the routes within the region defined by the selected level in the hierarchy in the real property database;
      controlling using the graphical user interface of the display system, the income information to focus to the region defined by the selected level in the hierarchy in the real property database; and
      displaying using the graphical user interface on the display system (a) the values of real properties along the routes within the region defined by the selected level in the hierarchy in the real property database, (b) the income information and (c) the traffic flow information for the workforce.

2. The computer system of claim 1, wherein the property analyzer:
   maps the locations of the people into a plurality of regions in the real property database; and
   updates the traffic flow information for the plurality of regions identified, wherein the traffic flow information in the plurality of regions is updated using the income information and the location information.

3. The computer system of claim 1, wherein the property analyzer
   changes, using the graphical user interface of the display system, a date of the income information;
   identifies statistical information for the region; and
   stores the statistical information in the real property database.

4. The computer system of claim 3, wherein the property analyzer
   selects, using the graphical user interface of the display system, the income information based on residential addresses or work addresses; and
   displays the statistical information for the region in the graphical user interface on the display system.

5. The computer system of claim 1, wherein: in displaying the income information in the graphical user interface on the display system, the property analyzer
   displays a map of the region in the request in the graphical user interface on the display system; and
   displays the traffic flow information in association with the map of the region in the request in the graphical user interface on the display system.

6. The computer system of claim 5, wherein in displaying the traffic flow information in association with the map of the region in the request the graphical user interface on the display system, the property analyzer
   displays a group of graphical indicators that indicate a workflow from a group of locations for the workforce.

7. The computer system of claim 1, wherein the region is selected from one of a census block, a block group, a census track, a county, and a state.

8. A method for analyzing and valuing real property by a computer system, the method comprising:
   receiving records with payroll information for people in a workforce using a property analyzer implemented in software, hardware, firmware, or a combination thereof and configured to analyze and value real property;
   transforming, using the property analyzer, the payroll information into income information;
   identifying, using the property analyzer, location information, including work locations and residence locations, from the payroll information for the people in the workforce;
   deriving, using the property analyzer, routes between the work locations and the residence locations for the people in the workforce;
   identifying, using the property analyzer, traffic flow along the routes by accumulating the derived routes between the work locations and the residence locations for the people in the workforce;
   controlling using a graphical user interface of a display system a selected level in a hierarchy of levels in a real property database to define a region;
   receiving, using the property analyzer, a request for traffic flow information for the workforce in the region defined by the selected level in the hierarchy of levels in the real property database;

identifying, using the property analyzer, the traffic flow information for the workforce in the region defined by the selected level in the hierarchy in the real property database;

identifying, using the property analyzer, values of real properties along the routes within the region defined by the selected level in the hierarchy in the real property database;

controlling, using the graphical user interface of the display system, the income information to focus to the region defined by the selected level in the hierarchy in the real property database; and displaying using the graphical user interface on the display system (a) the values of real properties along the routes within the region defined by the selected level in the hierarchy in the real property database, (b) the income information and (c) the traffic flow information for the workforce.

9. The method of claim 8 further comprising
mapping the locations of the people into a plurality of regions in the real property database; and
updating the traffic flow information for the plurality of regions identified, wherein the traffic flow information in the plurality of regions is updated using salary information and the location information.

10. The method of claim 8 further comprising
changing, using the graphical user interface of the display system, a date of the income information;
identifying statistical information for the region; and
storing the statistical information in the real property database.

11. The method of claim 10 further comprising
selecting, using the graphical user interface of the display system, the income information based on residential addresses or work addresses; and
displaying the statistical information for the region in the graphical user interface on the display system.

12. The method of claim 8, wherein displaying the income information in the graphical user interface on the display system comprises:
displaying a map of the region in the request in the graphical user interface on the display system; and
displaying the traffic flow information in association with the map of the region in the request in the graphical user interface on the display system.

13. The method of claim 12, wherein displaying the traffic flow information in association with the map of the region in the request in the graphical user interface on the display system comprises:
displaying a group of graphical indicators that indicate a workflow from a group of locations for the workforce.

14. The method of claim 8, wherein the region is selected from one of a census block, a block group, a census track, a county, and a state.

15. A computer program product comprising:
a computer readable storage media including instructions for analyzing and valuing real property, wherein the instructions comprise:
program code for receiving records with payroll information for people in a workforce using a property analyzer implemented in software, hardware, firmware, or a combination thereof and configured to analyze and value real property;

program code for transforming, using the property analyzer, the payroll information into income information;

program code for identifying, using the property analyzer, location information, including work locations and residence locations, from the payroll information for the people in the workforce;

program code for deriving, using the property analyzer, routes between the work locations and the residence locations for the people in the workforce;

program code for identifying, using the property analyzer, traffic flow along the routes by accumulating the derived routes between the work locations and the residence locations for the people in the workforce;

program code for controlling using a graphical user interface of a display system a selected level in a hierarchy of levels in a real property database to define a region;

program code for receiving, using the property analyzer, a request for traffic flow information for the workforce in the region defined by the selected level in the hierarchy of levels in the real property database;

program code for identifying, using the property analyzer, the traffic flow information for the workforce in the region defined by the selected level in the hierarchy of levels in the real property database;

program code for identifying, using the property analyzer, values of real properties along the routes within the region defined by the selected level in the hierarchy in the real property database;

program code for controlling, using the graphical user interface of the display system, the income information to focus to the region defined by the selected level in the hierarchy in the real property database; and program code for displaying using the graphical user interface on the display system (a) the values of real properties along the routes within the region defined by the selected level in the hierarchy in the real property database, (b) the income information and (c) the traffic flow information for the workforce.

16. The computer program product of claim 15, wherein the instructions further comprise:
program code for mapping the locations of the people into a plurality of regions in the real property database; and
program code for updating the traffic flow information for the plurality of regions identified, wherein the traffic flow information in the plurality of regions is updated using salary information and the location information.

17. The computer program product of claim 15, wherein the instructions further comprise:
program code for changing, using the graphical user interface of the display system, a date of the income information;
program code for identifying statistical information for the region; and
program code.

18. The computer program product of claim 17, wherein the instructions further comprise:
program code for selecting, using the graphical user interface of the display system, the income information based on residential addresses or work addresses; and
program code for displaying the statistical information for the region in the graphical user interface on the display system.

19. The computer program product of claim 15, wherein the instructions further comprise:
    program code for displaying a map of the region in the request in the graphical user interface on the display system; and
    program code for displaying the traffic flow information in association with the map of the region in the request in the graphical user interface on the display system.

20. The computer program product of claim 19, wherein the instructions further comprise:
    program code for displaying a group of graphical indicators that indicate a workflow from a group of locations for the workforce.

21. The computer program product of claim 15, wherein the region is selected from one of a census block, a block group, a census track, a county, and a state.

* * * * *